US010275995B2

(12) United States Patent
Schaefer

(10) Patent No.: US 10,275,995 B2
(45) Date of Patent: Apr. 30, 2019

(54) GAMING SYSTEM AND METHOD PROVIDING A SKILL-BASED WAGERING GAME WITH AN AVAILABLE SUPPLEMENTAL SKILL AWARD

(71) Applicant: IGT, Las Vegas, NV (US)

(72) Inventor: Craig Michael Schaefer, Las Vegas, NV (US)

(73) Assignee: IGT, Las Vegas ( * ) Notice: Subject to any disclaimer, the term of this patent is extended or adjusted under 35 U.S.C. 154(b) by 309 days.

(21) Appl. No.: 15/271,935

(22) Filed: Sep. 21, 2016

(65) Prior Publication Data

US 2018/0082543 A1 Mar. 22, 2018

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2018.01) |
| ***G07F 17/32*** | (2006.01) |

(52) U.S. Cl.

CPC ...... *G07F 17/3295* (2013.01); *G07F 17/3209* (2013.01); *G07F 17/3211* (2013.01); *G07F 17/3267* (2013.01)

(58) Field of Classification Search

CPC .............. G07F 17/32; A63F 2009/2457; A63F 2009/2458; A63F 13/847

See application file for complete search history.

(56) References Cited

U.S. PATENT DOCUMENTS

| | | | |
|---|---|---|---|
| 5,342,049 | A | 8/1994 | Wichinsky et al. |
| 6,050,895 | A | 4/2000 | Luciano, Jr. et al. |
| 6,174,235 | B1 | 1/2001 | Walker et al. |
| 6,309,300 | B1 | 10/2001 | Glavich |
| 6,315,664 | B1 | 11/2001 | Baerlocher et al. |
| 6,319,124 | B1 | 11/2001 | Baerlocher et al. |
| 6,334,814 | B1 | 1/2002 | Adams |
| 6,346,043 | B1 | 2/2002 | Colin et al. |
| 6,364,767 | B1 | 4/2002 | Brossard et al. |
| 6,439,995 | B1 | 8/2002 | Hughs-Baird et al. |
| 6,450,883 | B1 | 9/2002 | O'Halloran |
| 6,511,375 | B1 | 1/2003 | Kaminkow |
| 6,514,141 | B1 | 2/2003 | Kaminkow et al. |
| 6,554,703 | B1 | 4/2003 | Bussick et al. |
| 6,561,899 | B2 | 5/2003 | Vancura |

(Continued)

*Primary Examiner* — Kevin Y Kim

(74) *Attorney, Agent, or Firm* — Neal, Gerber & Eisenberg LLP

(57) ABSTRACT

Various embodiments of the present disclosure provide a skill-based wagering game with an available supplemental skill award. In various embodiments, the skill-based wagering game is a matching game. During play, the player makes skill inputs to attempt to correctly match moving objects to corresponding targets. The gaming system determines a primary award based on how many correct matches the player achieves, which is directly tied to the player's skill level during play. The primary award generally increases as the quantity of correct matches increases. For players who exhibit a high skill level during play (e.g., correctly match all of the moving objects to the targets), the gaming system may also provide a supplemental skill award. The probability of the supplemental skill award being large generally increases as the player's skill level during play increases.

18 Claims, 14 Drawing Sheets

(56) References Cited

U.S. PATENT DOCUMENTS

| | | | |
|---|---|---|---|
| 6,572,473 | B1 | 6/2003 | Baerlocher |
| 6,582,307 | B2 | 6/2003 | Webb |
| 6,599,185 | B1 | 7/2003 | Kaminkow et al. |
| 6,602,137 | B2 | 8/2003 | Kaminkow et al. |
| 6,609,971 | B2 | 8/2003 | Vancura |
| 6,632,139 | B1 | 10/2003 | Baerlocher |
| 6,666,765 | B2 | 12/2003 | Vancura |
| 6,669,559 | B1 | 12/2003 | Baerlocher et al. |
| 6,676,516 | B2 | 1/2004 | Baerlocher et al. |
| 6,733,386 | B2 | 5/2004 | Cuddy et al. |
| 6,746,016 | B2 | 6/2004 | Perrie et al. |
| 6,746,328 | B2 | 6/2004 | Cannon et al. |
| 6,749,502 | B2 | 6/2004 | Baerlocher |
| 6,761,632 | B2 | 7/2004 | Bansemer et al. |
| 6,769,983 | B2 | 8/2004 | Slomiany |
| 6,780,103 | B2 | 8/2004 | Bansemer et al. |
| 6,780,107 | B2 | 8/2004 | Baerlocher et al. |
| 6,783,457 | B2 | 8/2004 | Hughs-Baird et al. |
| 6,852,027 | B2 | 2/2005 | Kaminkow et al. |
| 6,855,053 | B2 | 2/2005 | Baerlocher |
| 6,863,606 | B1 | 3/2005 | Berg et al. |
| 6,875,108 | B1 | 4/2005 | Hughs-Baird |
| 6,877,745 | B1 | 4/2005 | Walker et al. |
| 6,918,830 | B2 | 7/2005 | Baerlocher |
| 6,918,834 | B2 | 7/2005 | Vancura |
| 6,932,701 | B2 | 8/2005 | Glavich et al. |
| 6,939,229 | B2 | 9/2005 | McClintic |
| 6,942,568 | B2 | 9/2005 | Baerlocher |
| 6,958,013 | B2 | 10/2005 | Miereau et al. |
| 6,964,416 | B2 | 11/2005 | McClintic et al. |
| 6,984,174 | B2 | 1/2006 | Cannon et al. |
| 6,988,732 | B2 | 1/2006 | Vancura |
| 7,004,834 | B2 | 2/2006 | Walker et al. |
| 7,008,318 | B2 | 3/2006 | Schneier et al. |
| 7,037,191 | B2 | 5/2006 | Rodgers et al. |
| 7,040,983 | B2 | 5/2006 | Dolloff et al. |
| 7,040,984 | B2 | 5/2006 | Mead |
| 7,056,192 | B2 | 6/2006 | Venigalla et al. |
| 7,056,210 | B2 | 6/2006 | Bansemer et al. |
| 7,077,744 | B2 | 7/2006 | Cannon |
| 7,121,942 | B2 | 10/2006 | Baerlocher |
| 7,128,646 | B2 | 10/2006 | Baerlocher et al. |
| 7,172,506 | B2 | 2/2007 | Baerlocher et al. |
| 7,175,521 | B2 | 2/2007 | McClintic |
| 7,175,524 | B2 | 2/2007 | Bansemer et al. |
| 7,235,011 | B2 | 6/2007 | Randall et al. |
| 7,252,591 | B2 | 8/2007 | Van Asdale |
| 7,264,545 | B2 | 9/2007 | Maya et al. |
| 7,273,415 | B2 | 9/2007 | Cregan et al. |
| 7,300,348 | B2 | 11/2007 | Kaminkow et al. |
| 7,314,409 | B2 | 1/2008 | Maya et al. |
| 7,316,609 | B2 | 1/2008 | Dunn et al. |
| 7,326,115 | B2 | 2/2008 | Baerlocher |
| 7,371,174 | B2 | 5/2008 | Baerlocher |
| 7,377,849 | B2 | 5/2008 | Baerlocher |
| 7,399,229 | B2 | 7/2008 | Rowe |
| 7,413,510 | B2 | 8/2008 | Schlegel et al. |
| 7,448,948 | B2 | 11/2008 | Hughs-Baird et al. |
| 7,473,175 | B2 | 1/2009 | Baerlocher |
| 7,544,129 | B2 | 6/2009 | Baerlocher |
| 7,547,252 | B2 | 6/2009 | Peterson et al. |
| 7,566,271 | B2 | 7/2009 | Hostetler et al. |
| 7,585,218 | B2 | 9/2009 | Mead et al. |
| 7,591,722 | B2 | 9/2009 | Baerlocher et al. |
| 7,690,981 | B2 | 4/2010 | Ching et al. |
| 7,722,461 | B2 | 5/2010 | Gatto et al. |
| 7,726,655 | B2 | 6/2010 | Walker et al. |
| 7,749,070 | B2 | 7/2010 | Baerlocher et al. |
| 7,785,188 | B2 | 8/2010 | Cannon |
| 7,789,749 | B2 | 9/2010 | Bansemer et al. |
| 7,806,760 | B2 | 10/2010 | Baerlocher |
| 7,846,015 | B2 | 12/2010 | Bansemer et al. |
| 7,867,074 | B2 | 1/2011 | Gerrard et al. |
| 7,874,908 | B2 | 1/2011 | Walker et al. |
| 7,887,405 | B2 | 2/2011 | Schneier et al. |
| 7,887,409 | B2 | 2/2011 | Baerlocher et al. |
| 7,914,373 | B2 | 3/2011 | Webb et al. |
| 7,963,845 | B2 | 6/2011 | Baerlocher |
| 8,029,355 | B2 | 10/2011 | Parente |
| 8,033,912 | B2 | 10/2011 | Cannon |
| 8,043,153 | B2 | 10/2011 | Ross et al. |
| 8,079,903 | B2 | 12/2011 | Nicely et al. |
| 8,118,662 | B2 | 2/2012 | Caputo et al. |
| 8,133,105 | B2 | 3/2012 | Walker et al. |
| 8,162,742 | B2 | 4/2012 | Oberberger |
| 8,221,206 | B2 | 7/2012 | Marks et al. |
| 8,231,453 | B2 | 7/2012 | Wolf et al. |
| 8,262,455 | B2 | 9/2012 | Caputo et al. |
| 8,277,302 | B2 | 10/2012 | Walker et al. |
| 8,287,364 | B2 | 10/2012 | Caputo et al. |
| 8,328,631 | B2 | 12/2012 | Baerlocher |
| 8,398,475 | B2 | 3/2013 | De Waal et al. |
| 8,435,111 | B2 | 5/2013 | Filipour et al. |
| 8,460,090 | B1 | 6/2013 | Gilliland |
| 8,475,262 | B2 | 7/2013 | Wolf et al. |
| 8,585,489 | B2 | 11/2013 | Cannon |
| 8,672,762 | B1 | 3/2014 | Basallo et al. |
| 8,708,804 | B2 | 4/2014 | Caputo et al. |
| 8,764,552 | B2 | 7/2014 | Wolf et al. |
| 8,864,572 | B2 | 10/2014 | Oberberger |
| 8,905,831 | B2 | 12/2014 | Lafky et al. |
| 9,005,014 | B2 | 4/2015 | Baerlocher |
| 9,196,129 | B2 | 11/2015 | Nicely et al. |
| 9,251,666 | B2 | 2/2016 | Oberberger |
| 9,286,765 | B2 | 3/2016 | Saunders et al. |
| 9,449,467 | B2 | 9/2016 | Leupp et al. |
| 9,508,223 | B2 | 11/2016 | Cannon |
| 9,514,596 | B2 | 12/2016 | Brunet de Courssou et al. |
| 9,514,598 | B2 | 12/2016 | Gatto et al. |
| 9,530,281 | B2 | 12/2016 | Basallo et al. |
| 2002/0049082 | A1 | 4/2002 | Bansemer et al. |
| 2002/0077165 | A1 | 6/2002 | Bansemer et al. |
| 2003/0119576 | A1 | 6/2003 | McClintic et al. |
| 2003/0125107 | A1 * | 7/2003 | Cannon .................. G07F 17/32 463/25 |
| 2003/0190946 | A1 | 10/2003 | Baerlocher |
| 2004/0048644 | A1 | 3/2004 | Gerrard et al. |
| 2004/0116173 | A1 | 6/2004 | Baerlocher |
| 2004/0198490 | A1 | 10/2004 | Bansemer et al. |
| 2005/0026664 | A1 | 2/2005 | Bansemer et al. |
| 2005/0054435 | A1 | 3/2005 | Rodgers et al. |
| 2005/0143162 | A1 | 6/2005 | Schneier et al. |
| 2005/0181853 | A1 | 8/2005 | Baerlocher |
| 2006/0030401 | A1 | 2/2006 | Mead et al. |
| 2006/0205474 | A1 | 9/2006 | Bansemer et al. |
| 2006/0246999 | A1 | 11/2006 | Schneier et al. |
| 2007/0129133 | A1 | 6/2007 | Bansemer et al. |
| 2008/0015004 | A1 | 1/2008 | Gatto et al. |
| 2008/0108410 | A1 | 5/2008 | Baerlocher |
| 2008/0311980 | A1 | 12/2008 | Cannon |
| 2009/0131158 | A1 | 5/2009 | Brunet de Courssou et al. |
| 2010/0120502 | A1 | 5/2010 | Oberberger |
| 2010/0184507 | A1 | 7/2010 | Gatto et al. |
| 2010/0234089 | A1 | 9/2010 | Saffari et al. |
| 2011/0053676 | A1 | 3/2011 | Wolf et al. |
| 2011/0212768 | A1 | 9/2011 | Baerlocher |
| 2012/0009992 | A1 | 1/2012 | Cannon |
| 2012/0015713 | A1 | 1/2012 | Cannon |
| 2012/0276966 | A1 | 11/2012 | Wolf et al. |
| 2013/0065677 | A1 | 3/2013 | Baerlocher |
| 2013/0079098 | A1 | 3/2013 | Nicely et al. |
| 2013/0225268 | A1 | 8/2013 | Caputo et al. |
| 2013/0273990 | A1 | 10/2013 | Oberberger |
| 2013/0296020 | A1 | 11/2013 | Wolf et al. |
| 2014/0087808 | A1 * | 3/2014 | Basallo ............... G07F 17/3262 463/16 |
| 2014/0087844 | A1 | 3/2014 | Gilliland et al. |
| 2014/0087869 | A1 | 3/2014 | Thorne |
| 2015/0018072 | A1 | 1/2015 | Palchetti et al. |
| 2015/0161849 | A1 | 6/2015 | Cannon |
| 2016/0125697 | A1 | 5/2016 | Oberberger |

(56) References Cited

U.S. PATENT DOCUMENTS

| | | | |
|---|---|---|---|
| 2017/0084124 | A1 | 3/2017 | Brunet de Courssou et al. |
| 2017/0100672 | A1 | 4/2017 | Basallo et al. |

* cited by examiner

1000

GAMING SYSTEM AND METHOD PROVIDING A SKILL-BASED WAGERING GAME WITH AN AVAILABLE SUPPLEMENTAL SKILL AWARD

COPYRIGHT NOTICE

A portion of this patent document contains material subject to copyright protection. The copyright owner does not object to photocopy reproduction of the patent document in the form it appears in the U.S. Patent and Trademark Office records, but otherwise reserves all copyright rights.

BACKGROUND

Electronic gaming machines (EGMs) operable to enable play of wagering games are well known. A typical wagering game includes a primary or base game, and certain wagering games also include one or more bonus or secondary games.

Generally, these EGMs initiate a play of the primary game following: (1) receipt of a wager input (such as an actuation of a wager button) that indicates how much the player desires to wager; and (2) receipt of a game initiation input (such as an actuation of a play button). Many of these EGMs determine any primary awards for a wagered-on play of the primary game based on: (1) the outcome of the play of the primary game; and (2) the wager amount. Typically, the larger the wager amount, the larger the primary award (for the same outcome). Winning outcomes that are less likely to occur usually result in larger primary awards than winning outcomes that are more likely to occur.

EGMs operable to enable play of a bonus game usually initiate a play of the bonus game upon an occurrence of a bonus triggering event. These EGMs don't typically require placement of an additional wager to play the bonus game. These EGMs determine any bonus awards for the play of the bonus game (in addition to any primary awards) based on: (1) the outcome of the play of the bonus game; and (2) the wager amount.

For a particular wagering game, an EGM is usually configured to pay back, on average and over a large quantity of plays of that wagering game on that EGM, a certain percentage of the money players wager on the wagering game. The average percentage of money wagered that the EGM pays back to the players of the wagering game is typically called the average expected payback percentage (AEP %) of the wagering game. The more plays of the wagering game played on that EGM, the more likely the actual payback percentage of the wagering game will approach its AEP %. For a typical EGM operable to provide a wagering game including a primary game and a bonus game, the AEP % of the wagering game includes: (1) the primary game AEP %; and (2) the bonus game AEP % (which takes into account the probability of triggering the bonus game). The primary game and bonus game AEP % are calculated separately, but together form the wagering game AEP %. Wagering game developers can modify the primary game and/or bonus game AEP % to offer different player experiences.

Most wagering gaming technology focuses on primary and bonus games of chance, not skill. Many primary and bonus games rely on a random (or pseudo-random) number generator to randomly determine an outcome for each play of the primary or bonus game (which in turn may be tied to an award via a paytable). Since these types of games require no special skills, an inexperienced player can perform just as well as an experienced player.

Skill-based games rely (at least partially) on player skill—not solely a random (or pseudo-random) number generator—to determine an outcome. Many people have grown accustomed to playing skill-based games on home video game consoles, smartphones, and tablet computers. While some would enjoy wagering on and playing skill-based games at EGMs, skill-based games have proven problematic in the gaming industry for game developers and gaming establishments. For instance, since a high-skill player can master a skill-based game, game developers may have to make the skill-based game relatively difficult or reduce the available awards to make the economics work. Increasing the difficulty level may alienate low-skill (or even medium-skill) players who won't be able to achieve a sufficient level of success while playing the skill-based game to justify continued play. And decreasing the available awards may alienate high-skill players who have no incentive to master the skill-based game due to the paltry awards. The players may not have good gaming experiences and may stop playing.

It is technically difficult to create gaming systems configured to operate wagering games that include a skill-based component that satisfy players of all skill levels. There is a continuing need to develop new and improved wagering gaming technology to solve this problem and provide skill-based gaming systems that appeal to players of all skill levels.

SUMMARY

The gaming systems and methods of the present disclosure improve gaming technology and solve the above-described problem by providing a skill-based wagering game having an easy-to-learn skill mechanic that appeals to low-skill and medium-skill players yet still offers high-skill players the chance to win large (supplemental) skill awards.

In various embodiments, the skill-based wagering game is a matching game. During play, the player makes skill inputs to attempt to correctly match moving objects to corresponding targets. The gaming system determines a primary award based on how many correct matches the player achieves, which is directly tied to the player's skill level during play. The primary award generally increases as the quantity of correct matches increases. For players who exhibit a high skill level during play (e.g., correctly match all of the moving objects to the targets), the gaming system may also provide a supplemental skill award. The probability of the supplemental skill award being large generally increases as the player's skill level during play increases.

More specifically, upon initiating a play of the skill-based wagering game, the gaming system randomly determines the play's difficulty level by: (1) randomly determining one of a plurality of different symbol similarity levels, which controls how similar the symbols on the objects in play are to one another; (2) randomly determining, based on the determined symbol similarity level, a plurality of target objects from a plurality of different objects, each of which has one of a plurality of different symbols; (3) determining a plurality of moving objects from the plurality of different objects, the moving objects including: (a) for each target object, an object with a symbol that matches the symbol of that target object, and (b) one or more objects having symbols that don't match any symbols of the target objects; and (4) randomly determining one of a plurality of different object movement speeds, which controls how fast the moving objects move during play.

The gaming system also randomly determines the maximum winnable primary award for the play based on the determined symbol similarity level and the determined object movement speed. The player's skill level during play controls how much of this maximum winnable primary award the gaming system will provide as the actual primary award.

After randomly determining the difficulty level and the maximum winnable primary award, the gaming system: (1) displays the target objects; and (2) sequentially displays the moving objects moving relative to the target objects. As a moving object moves, the gaming system monitors for: (1) receipt of a skill-based match input that associates that moving object with a target object; and (2) that moving object satisfying an exit condition. Responsive to receiving a match input for a moving object, the gaming system displays that moving object in association with the identified target object. Responsive to a moving object satisfying the exit condition, the gaming system discards that moving object and does not use it to determine any awards.

After each moving object has been associated with a target object or discarded, the gaming system determines a quantity of correct matches. It does so by, for each target object, comparing the symbol of that target object with the symbol of any moving object displayed in association with that target object. If the symbols are the same, the match is a correct match, and if not the match is an incorrect match. The gaming system determines how much of the maximum winnable primary award to provide as the actual primary award based on the quantity of correct matches. Generally, the more correct matches, the larger the portion of the maximum winnable primary award the gaming system provides as the actual primary award.

In addition to providing the actual primary award, the gaming system determines whether a supplemental skill award condition is met based on the player's skill level during play (e.g., based on the quantity of correct matches). If the supplemental skill award condition is met, the gaming system determines and provides a supplemental skill award. The supplemental skill award is a randomly determined percentage of a skill pool (of credits) that the skill-based primary wagering game (in part) funds. The higher the player's skill level during play, the more likely the gaming system will determine a larger percentage of the skill pool to provide as the supplemental skill award.

Additional features and advantages are described in, and will be apparent from, the following Detailed Description and the Figures.

DETAILED DESCRIPTION

The gaming systems and methods of the present disclosure improve gaming technology and solve the above-described problem by providing a skill-based wagering game having an easy-to-learn skill mechanic that appeals to low-skill and medium-skill players yet still offers high-skill players the chance to win large (supplemental) skill awards. In various embodiments, the skill-based wagering game is a matching game. During play, the player makes skill inputs to attempt to correctly match moving objects to corresponding targets. The gaming system determines a primary award based on how many correct matches the player achieves, which is directly tied to the player's skill level during play. The primary award generally increases as the quantity of correct matches increases. For players who exhibit a high skill level during play (e.g., correctly match all of the moving objects to the targets), the gaming system may also provide a supplemental skill award. The probability of the supplemental skill award being large generally increases as the player's skill level during play increases.

The Detailed Description uses numbered headings for clarity. These headings do not limit the scope of the present disclosure

1. Example Method

Figure 1A:
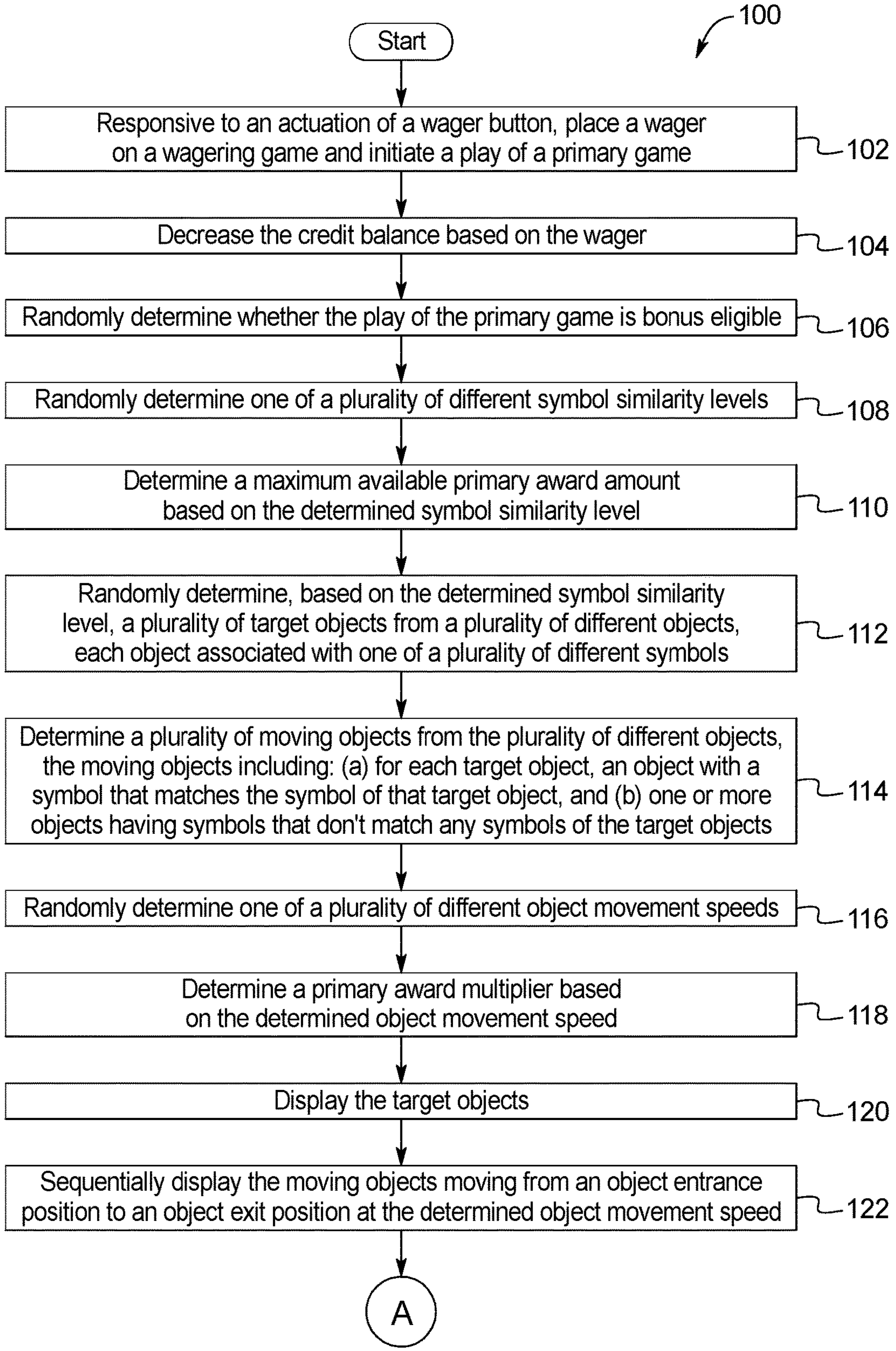
FIGS. 1A-1B illustrate a flowchart of an example process or method of operating a gaming system of the present disclosure to provide an example wagering game including (1) a skill-based primary game with an available supplemental skill award and (2) a triggerable bonus game.
Figure 1B:
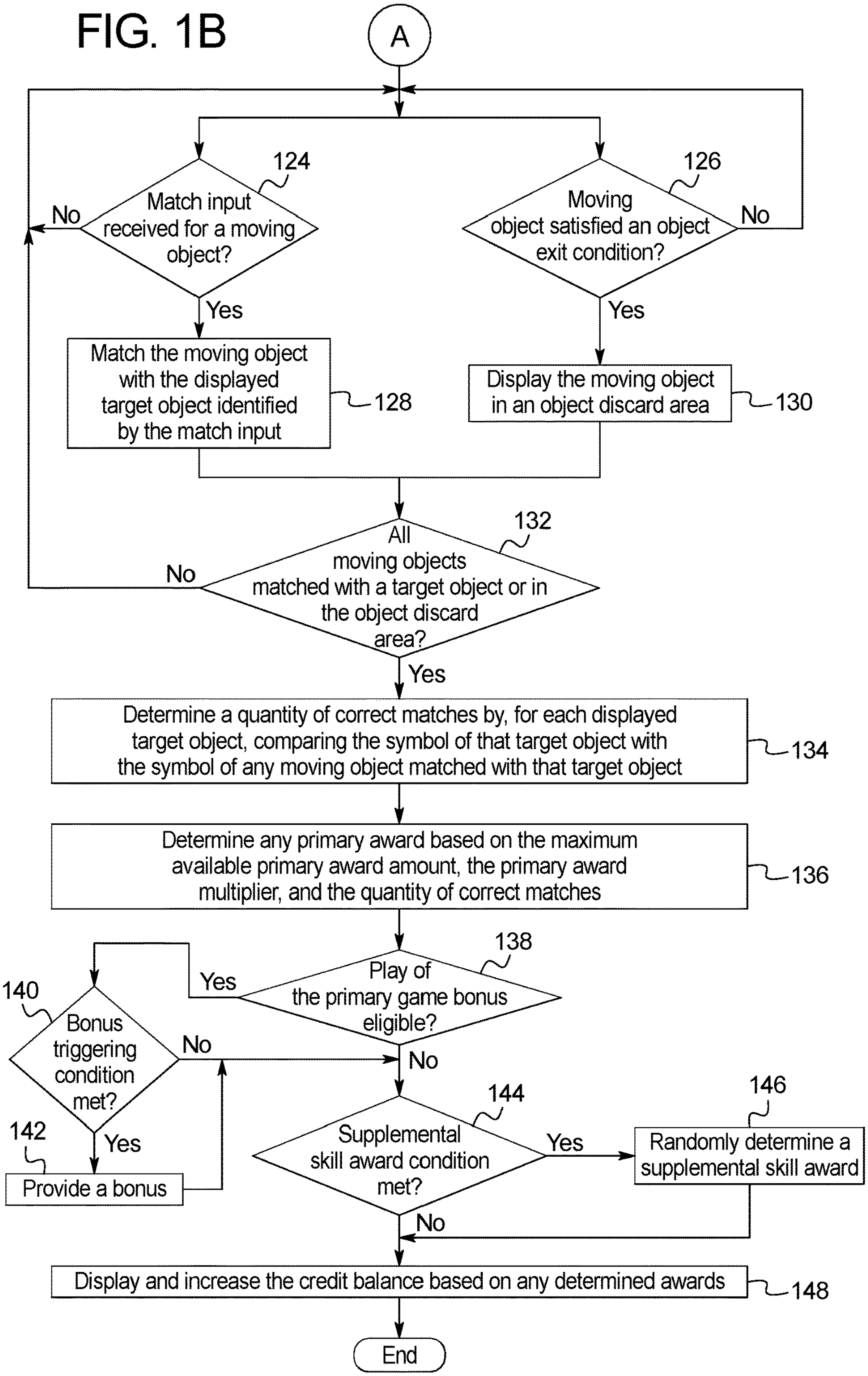

FIGS. 1A-1B illustrate a flowchart of an example process or method 100 of operating a gaming system of the present disclosure to provide an example wagering game including (1) a skill-based primary game with an available supplemental skill award and (2) a triggerable bonus game. In various embodiments, a set of instructions stored in one or more memories and executed by one or more processors represents the process 100. Although the process 100 is described with reference to the flowchart shown in FIGS. 1A-1B, many other processes of performing the acts associated with this illustrated process 100 may be employed. For example, the order of certain of the illustrated blocks or diamonds may be changed, certain of the illustrated blocks or diamonds may be optional, or certain of the illustrated blocks or diamonds may not be employed.

In operation of this example embodiment, the process 100 begins after the gaming system establishes a credit balance for a player (such as after an acceptor of the gaming system receives physical currency or a physical ticket associated with a monetary value). Responsive to an actuation of a wager button, the gaming system places a wager on the wagering game and initiates a play of the primary game, as block 102 indicates. The gaming system decreases the credit balance based on the wager, as block 104 indicates. The gaming system randomly determines whether the play of the primary game is bonus eligible, as block 106 indicates.

The gaming system randomly determines the difficulty level of and the maximum available primary award for the play of the primary game via a series of random determinations.

The gaming system randomly determines one of a plurality of different symbol similarity levels, which controls how similar the symbols on the objects in play are to one another, as block 108 indicates. The plurality of symbol similarity levels range from a lowest symbol similarity level to a highest symbol similarity level. The higher the determined symbol similarity level for the play of the primary game, the more similar the symbols on the objects in play are to one another for that play (and the more difficult that play is).

Using the determined symbol similarity level, the gaming system determines a maximum available primary award amount, as block 110 indicates. For instance, the gaming system randomly determines the maximum available primary award amount using a weighted table associated with the determined symbol similarity level. Different symbol similarity levels are associated with different weighted tables such that the higher the determined symbol similarity level, the more likely the gaming system will determine a large maximum available primary award amount (i.e., the more difficult the play of the primary game, the more likely the player will win a large award for performing at a high skill level during play).

The gaming system also uses the determined symbol similarity level to randomly determine a plurality of target objects from a plurality of different objects (such as according to object selection criteria), as block 112 indicates. Each of the plurality of different objects is associated with one of a plurality of different symbols. The gaming system also determines a plurality of moving objects from the plurality of different objects, as block 114 indicates. The moving objects include: (1) for each target objects, an object with a symbol that matches the symbol of that target object, and (2) one or more objects having symbols that don't match any symbols of the target objects and that are randomly determined based on the determined symbol similarity level (such as according to object selection criteria). As noted above, the similarity of the symbols on the moving objects to one another varies based on the determined symbol similarity level (the higher the determined symbol similarity level, the more similar the objects' symbols).

The gaming system also randomly determines one of a plurality of different object movement speeds, which controls how fast the moving objects move during play, as block 116 indicates. The plurality of object movement speeds range from a lowest object movement speed to a highest object movement speed. The higher the determined object movement speed for the play of the primary game, the faster the moving objects move during that play (and the more difficult that play is).

Using the determined object movement speed, the gaming system determines a primary award modifier (in this example embodiment, a multiplier), as block 118 indicates. For instance, the gaming system randomly determines the primary award modifier amount using a weighted table associated with the determined object movement speed. Different object movement speeds are associated with different weighted tables such that the higher the determined object movement speed, the more likely the gaming system will determine a large primary award modifier (i.e., the more difficult the play of the primary game, the more likely the player will win a large award for performing at a high skill level during play).

At this point, the gaming system has: (1) determined the difficulty level of the play of the primary game by randomly determining the symbol similarity level, randomly determining the objects in play, and randomly determining the object movement speed; and (2) determined the maximum available primary award for the play by determining the maximum available primary award amount (based on the determined symbol similarity level) and the primary award modifier (based on the determined object movement speed).

The gaming system displays the target objects, as block 120 indicates. The gaming system sequentially displays the moving objects moving from an object entrance position to an object exit position at the determined object movement speed, as block 122 indicates. The gaming system then monitors for: (1) receipt of a match input for a moving object, as diamond 124 indicates; and (2) a moving object satisfying an object exit condition, as diamond 126 indicates.

If the gaming system determines at diamond 124 that a match input for a moving object has been received, the gaming system matches the moving object with the displayed target object identified by the match input, as block 128 indicates, and process 100 proceeds to diamond 132, described below. If not, the gaming system continues to monitor for: (1) receipt of a match input for a moving object at diamond 124; and (2) a moving object satisfying an object exit condition at diamond 126.

If the gaming system determines at diamond 126 that a moving object has satisfied the object exit condition, the gaming system displays the moving object in an object discard area, as block 130 indicates, and process 100 proceeds to diamond 132, described below. If not, the gaming system continues to monitor for: (1) receipt of a match input for a moving object at diamond 124; and (2) a moving object satisfying an object exit condition at diamond 126.

The gaming system determines at diamond 132 whether all moving objects are either matched with a target object or displayed in the object discard area. If not (i.e., if at least one moving object is neither matched a target object nor in the object discard area), the gaming system continues to monitor for: (1) receipt of a match input for a moving object at diamond 124; and (2) a moving object satisfying an object exit condition at diamond 126.

But if the gaming system determines at diamond 132 that all moving objects are either displayed in association with a target object or displayed in the object discard area, the gaming system determines a quantity of correct matches by, for each displayed target object, comparing the symbol of that target object with the symbol of any moving object matched with that target object, as block 134 indicates. The gaming system determines any primary award based on the maximum available primary award amount, the primary award modifier, and the quantity of correct matches, as block 136 indicates. For instance, the gaming system: (1) uses the quantity of correct matches to determine an amount (e.g., 0%, 50%, or 100%) of the maximum available primary award amount to use; and (2) uses the primary award modifier to modify the determined amount of the maximum available primary award amount to determine the primary award.

The gaming system determines whether the play of the primary game is bonus eligible (as determined in block 106), as diamond 138 indicates. If not, process 100 proceeds to diamond 144, described below. But if the gaming system determines at diamond 138 that the play of the primary game is bonus eligible, the gaming system determines whether a bonus triggering condition is met, as diamond 140 indicates. In this example embodiment, the gaming system determines whether the bonus triggering condition is met based on the quantity of correct matches—i.e., the player's skill during the play of the primary game controls whether the bonus triggering condition is met.

If the gaming system determines at diamond 140 that the bonus triggering condition is not met, process 100 proceeds to diamond 144, described below. But if the gaming system determines at diamond 140 that the bonus triggering condition is met, the gaming system provides a bonus (e.g., a play of a bonus game or a bonus award), as block 142 indicates.

The gaming system determines at diamond 144 whether a supplemental skill award condition is met. In this example embodiment, the gaming system determines whether the supplemental skill award condition is met based on the quantity of correct matches—i.e., the player's skill during the play of the primary game controls whether the supplemental skill award condition is met. If the gaming system determines at diamond 144 that the supplemental skill award condition is not met, process 100 proceeds to block 148, described below.

But if the gaming system determines at diamond 144 that the supplemental skill award condition is met, the gaming system randomly determines a supplemental skill award, as block 146 indicates. In this example embodiment, the supplemental skill award is a percentage of a skill pool randomly determined via a weighted table. The higher the player's skill level during the play of the primary game (in this example embodiment, the higher the quantity of correct matches), the more likely the gaming system will determine a larger percentage of the skill pool to provide as the supplemental skill award. The gaming system displays and increases the credit balance based on any determined awards (in this example embodiment, any primary credit awards, any supplemental skill credit awards, and any credit awards won via any bonus), as block 148 indicates.

2. Example Gaming System Operation

FIGS. 2A-2H illustrate screen shots of one example embodiment of a gaming system operating an example wagering game including (1) a skill-based primary game with an available supplemental skill award and (2) a triggerable bonus game. The primary game is a matching game. During play, objects are sequentially revealed, and the player makes skill inputs to attempt to correctly match the objects to corresponding targets. The bonus game includes a spin of an award wheel.

In this example embodiment, for the primary game, the gaming system displays, such as on a display device 2114 (described below): (1) a conveyor belt 200 including an object entrance position 202 and an object exit position 204; (2) an object discard area 300; (3) an award meter 292 that displays any awards won for a play of the wagering game; (4) a credit meter 293 that indicates the player's credit balance; (5) a bet meter 294 that displays the player's bet for a play of the wagering game; and (6) a START button 295 that, when actuated by the player, causes the gaming system to initiate a play of the wagering game.

Figure 2A:
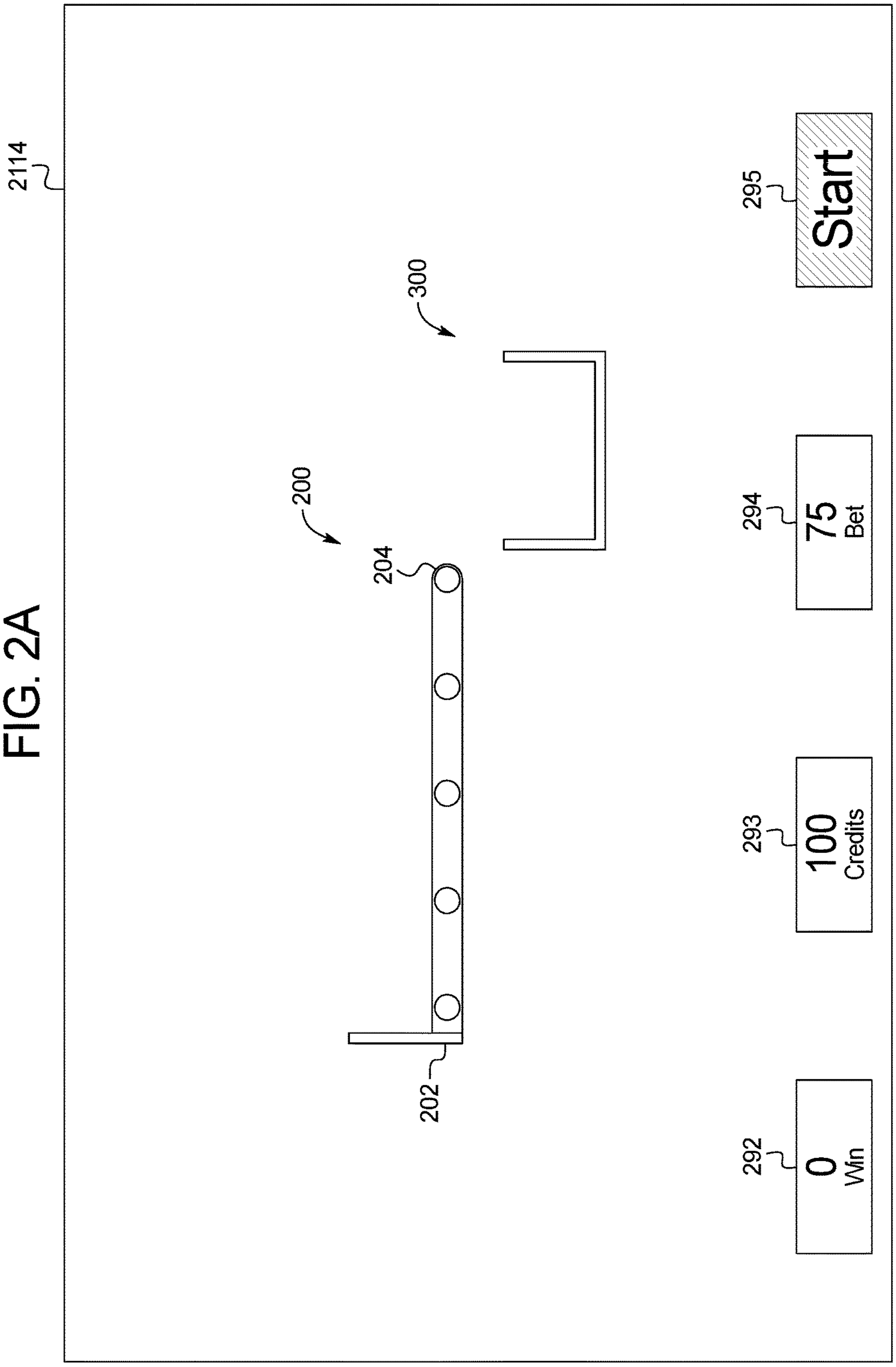
FIGS. 2A-2H illustrate screen shots of a gaming system operating an example wagering game including (1) a skill-based primary game with an available supplemental skill award and (2) a triggerable bonus game.

As illustrated in FIG. 2A, in this example embodiment, the gaming system receives value, such as physical currency (or its equivalent), via an acceptor. In this embodiment, the gaming system provides the player 100 credits, which represents the received value, and displays the player's credit balance of 100 credits in the credit meter 293. The gaming system receives an actuation of the START button 295.

Responsive to the actuation of the START button 295, the gaming system places a 75 credit bet on a play of the wagering game, deducts the 75 credit bet from the credit balance, and initiates a play of the primary game. The gaming system then randomly determines the difficulty level of and the maximum available primary award for the play of the primary game via a series of random determinations.

The gaming system randomly determines one of a plurality of different symbol similarity levels for the play of the primary game, which controls how similar the symbols on the objects in play are to one another. Table 1 below includes the symbol similarity levels and their associated probabilities of being selected. The plurality of symbol similarity levels range from a Low symbol similarity level to a High symbol similarity level, and the probability of being selected decreases moving from the Low symbol similarity level to the High symbol similarity level. In this example embodiment, the gaming system randomly selects the Medium symbol similarity level for the play of the primary game.

TABLE 1

Example symbol similarity level weighted table

| Symbol similarity level | Probability of selection |
|---|---|
| Low | 80% |
| Medium | 13.33% |
| High | 6.67% |

Each symbol similarity level is associated with a maximum available primary award amount weighted table that associates different maximum available primary award amounts with probabilities of being selected. The different symbol similarity levels are associated with different weighted tables such that the higher the determined symbol similarity level for a play of the primary game, the more likely the gaming system will determine a large maximum available primary award amount for that play. In this example embodiment, the gaming system uses the maximum available primary award amount weighted table for the Medium symbol similarity level shown in Table 2 below to randomly select a maximum available primary award amount of 500 credits for the play of the primary game.

TABLE 2

Example maximum available primary award amount weighted table for Medium symbol similarity level

| Maximum available primary award amount (credits) | Probability of selection |
|---|---|
| 10 | 0% |
| 20 | 2.46% |
| 30 | 24.63% |
| 40 | 36.95% |
| 50 | 24.63% |
| 80 | 3.94% |
| 100 | 2.46% |
| 200 | 1.97% |
| 300 | 1.48% |
| 400 | 0.99% |
| 500 | 0.49% |

The gaming system also uses the determined Medium symbol similarity level to randomly determine a plurality of target objects from a plurality of different objects (not shown). Each of the plurality of different objects is associated with one of a plurality of different symbols. In this example embodiment, the gaming system determines target objects 210*a* (spotted diamond symbol), 210*b* (hatched heart symbol), 210*c* (hatched diamond symbol), and 210*d* (spotted spade symbol) from the plurality of different objects. The gaming system also determines a plurality of moving objects from the plurality of different objects. The moving objects include: (1) for each target object, an object with a symbol that matches the symbol of that target object, and (2) one or more objects having symbols that don't match any symbols of the target objects and that are randomly-determined based on the determined symbol similarity level. In this example embodiment, the gaming system determines moving objects 220*a* (spotted diamond symbol), 220*c* (hatched heart symbol), 220*c* (hatched diamond symbol), 220*d* (spotted spade symbol), 220*e* (spotted heart symbol), 220*f* (hatched spade symbol), 220*g* (spotted club symbol), and 220*h* (hatched club symbol) from the plurality of different objects.

The gaming system randomly determines one of a plurality of different object movement speeds for the play of the primary game, which controls how fast the moving objects move during play. Table 3 below includes the object movement speeds and their associated probabilities of being selected. The plurality of object movement speeds range from a Slowest object movement speed to a Fastest object movement speed, and the probability of being selected decreases moving from the Slowest object movement speed to the Fastest object movement speed. In this example embodiment, the gaming system randomly selects the Faster object movement speed for the play of the primary game.

TABLE 3

Example object movement speed weighted table

| Object movement speed | Probability of selection |
|---|---|
| Slower | 77.78% |
| Faster | 11.11% |
| Fast | 7.41% |
| Fastest | 3.70% |

Each object movement speed is associated with a primary award modifier weighted table that associates different primary award modifiers—multipliers in this example embodiment—with probabilities of being selected. The different object movement speeds are associated with different weighted tables such that the higher the determined object movement speed for a play of the primary game, the more likely the gaming system will determine a large primary award multiplier for that play. In this example embodiment, the gaming system uses the primary award modifier weighted table for the Faster object movement speed shown in Table 4 below to randomly select a primary award multiplier of 2× for the play of the primary game.

TABLE 4

Example primary award multiplier weighted table

| Primary award multiplier | Probability of selection |
|---|---|
| 1× | 71.43% |
| 2× | 11.43% |
| 3× | 8.57% |
| 5× | 5.71% |
| 10× | 2.86% |

As this point, the gaming system has: (1) determined the difficulty level of the play of the primary game by randomly determining the symbol similarity level, randomly determining the objects in play, and randomly determining the object movement speed; and (2) determined the maximum available primary award for the play by determining the maximum available primary award amount (based on the determined symbol similarity level) and the primary award modifier (based on the determined object movement speed). Table 5 below shows these characteristics for the play of the primary game.

TABLE 5

Characteristics for example play of the primary game

| Characteristic | Value |
|---|---|
| Symbol similarity level | Medium |
| Object movement speed | Faster |
| Maximum available primary award amount | 500 credits |
| Primary award multiplier | 2× |

The gaming system also randomly determines (based on a suitable weighted table, not shown) whether the play of the primary game is bonus eligible. In this example embodiment, the gaming system determines that the play of the primary game is not bonus eligible.

Figure 2B:
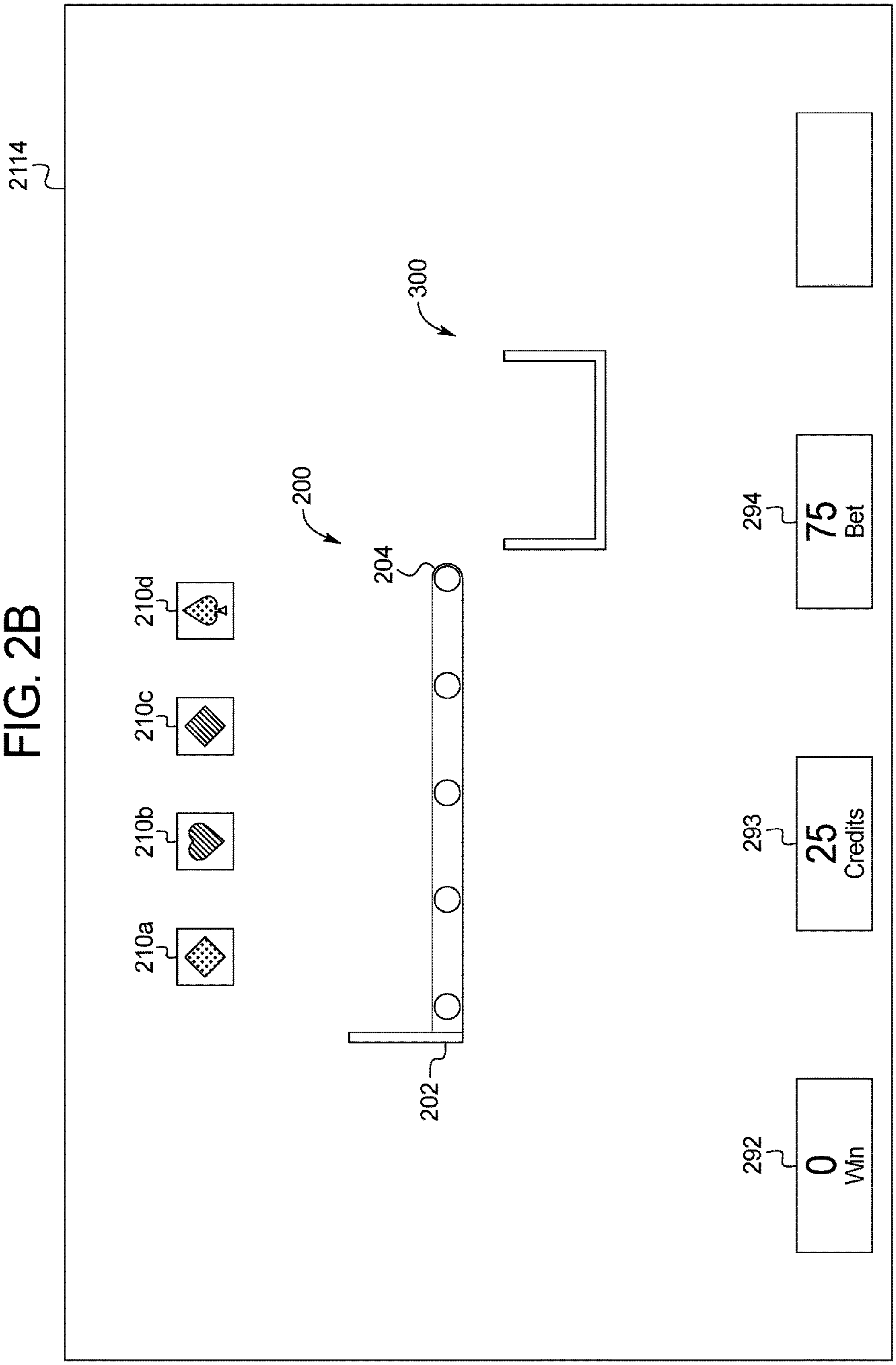
Figure 2C:
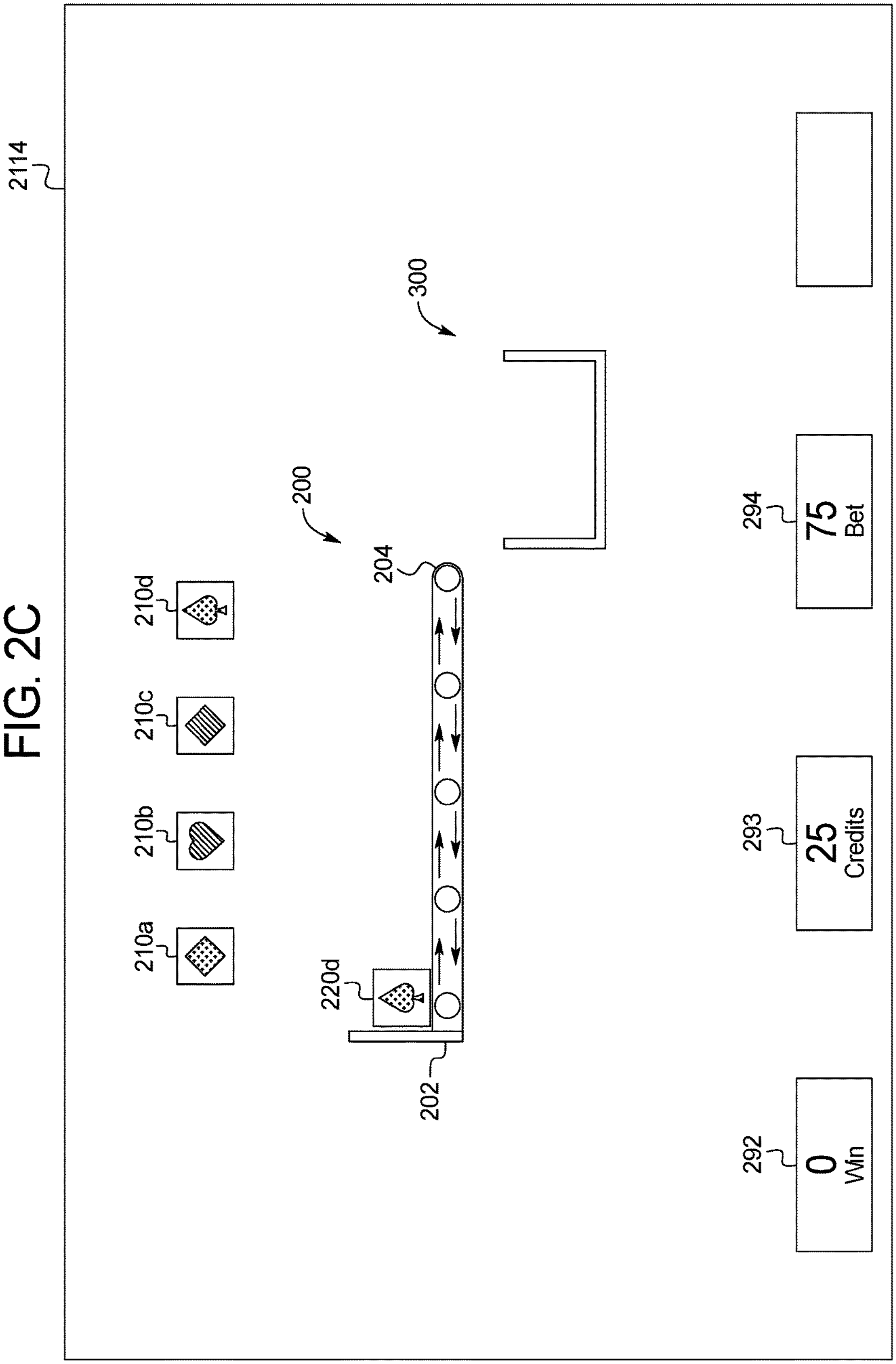
Figure 2D:
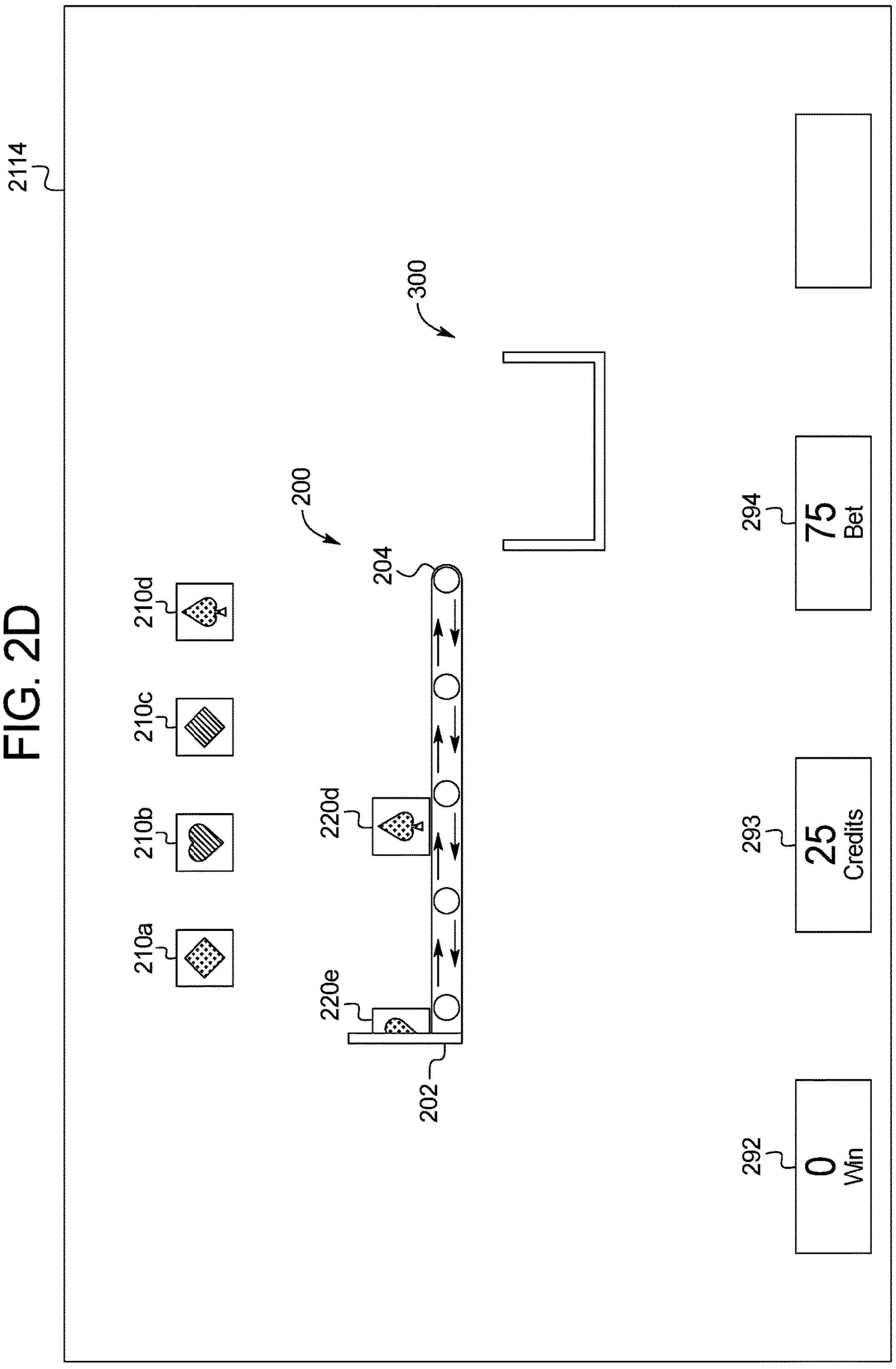

As illustrated in FIG. 2B, the gaming system displays the target objects 210*a*, 210*b*, 210*c*, and 210*d* above the conveyor belt 200. As illustrated in FIGS. 2C-2D, the gaming system activates the conveyor belt 200, and afterwards begins sequentially revealing the moving objects at the object entrance position 202 and displaying them moving along the conveyor belt 200 toward the object exit area 204. The gaming system reveals moving object 220*d* at the object entrance position 202 and displays the moving object 220*d* moving along the conveyor belt 200 toward the object exit position 204.

After revealing a moving object at the object entrance position 202, the gaming system monitors for: (1) receipt of a match input for a moving object that identifies one of the target objects 210*a*, 210*b*, 210*c*, and 210*d*; and (2) the moving object satisfying an object exit condition, which in this embodiment is the moving object reaching the object exit position 204. If a match input is received for a moving object and the identified target object isn't already matched to another moving object, the gaming system matches the moving object with the identified target object and moves the moving object off of the conveyor belt such that it's displayed in association with the identified target object. If the moving object instead reaches the object exit position 204 (satisfying the object exit condition), the gaming system displays the moving object in the object discard area 300.

Figure 2E:
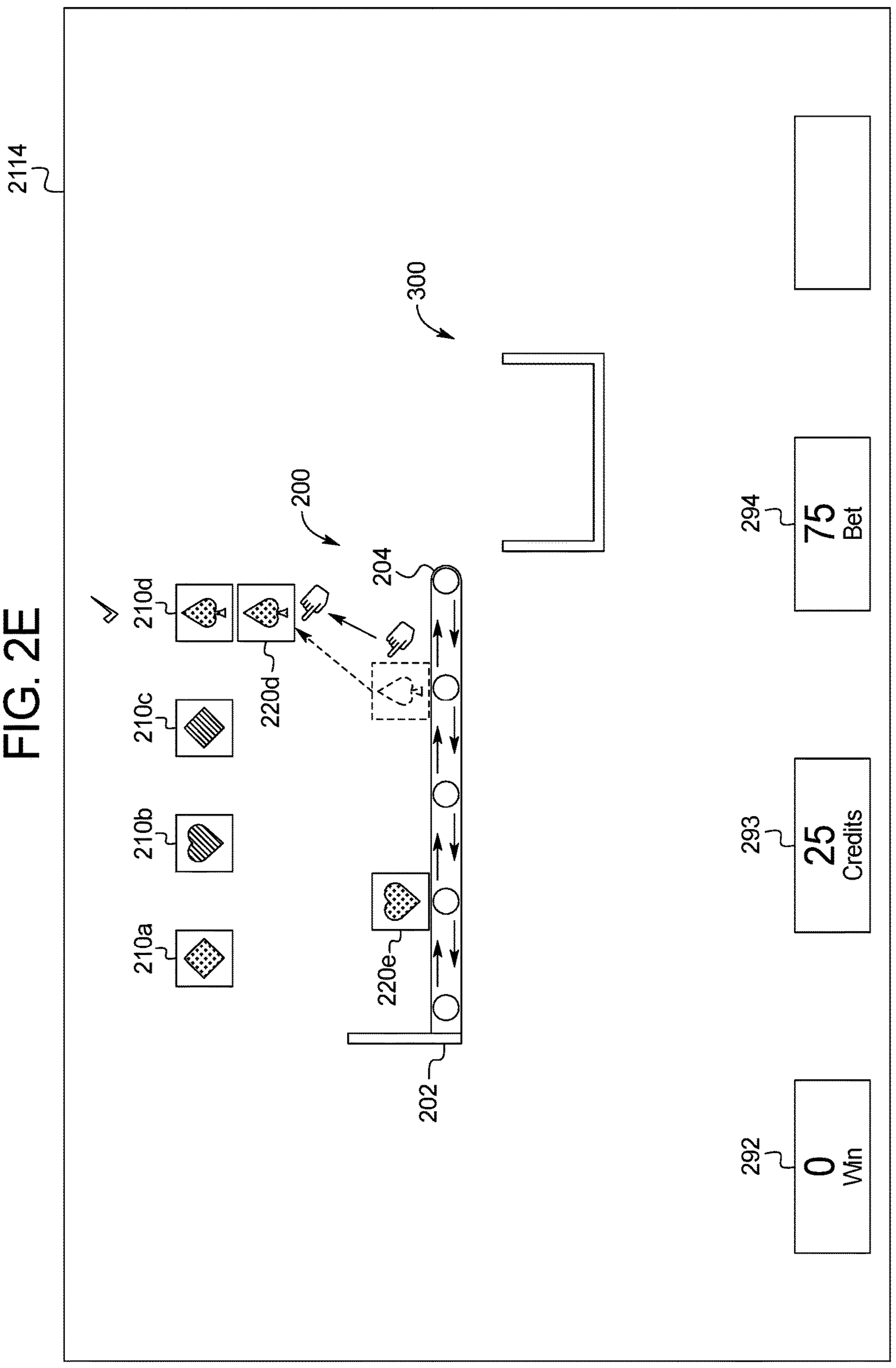

As illustrated in FIG. 2E, the gaming system receives a match input for the moving object 220*d*. The match input identifies the target object 210*d*. Since the target object 210*d* hasn't yet been matched with a moving object, the gaming system matches the moving object 220*d* with the target object 210*d* and moves the moving object 220*d* off of the conveyor belt such that it's displayed in association with the target object 210*d*.

Figure 2F:
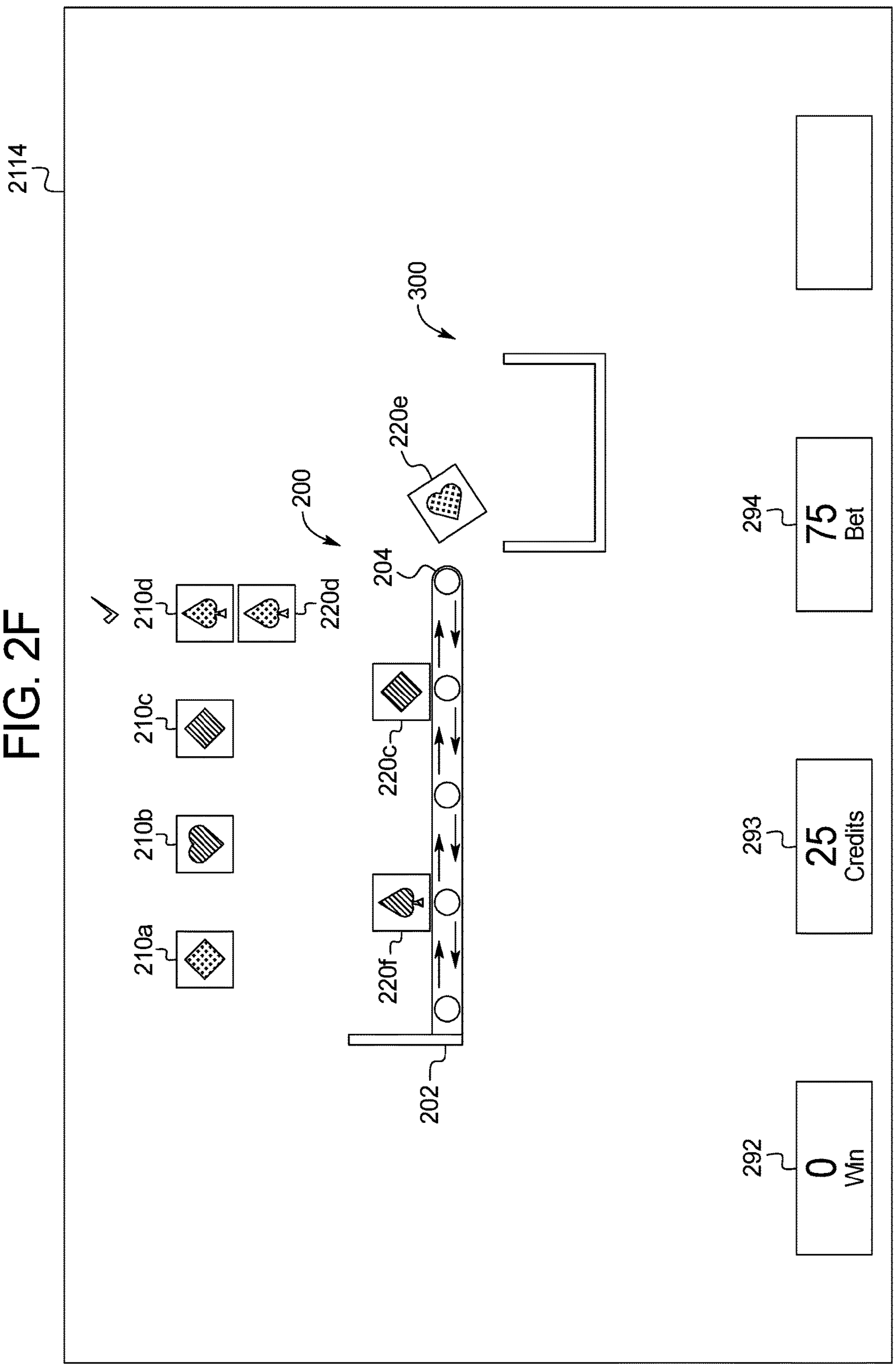

As illustrated in FIG. 2F, the moving object 220*e* reaches the object exit position 204, satisfying the object exit condition. Accordingly, the gaming system displays the moving object 220*e* entering the object discard area 300.

Figure 2G:
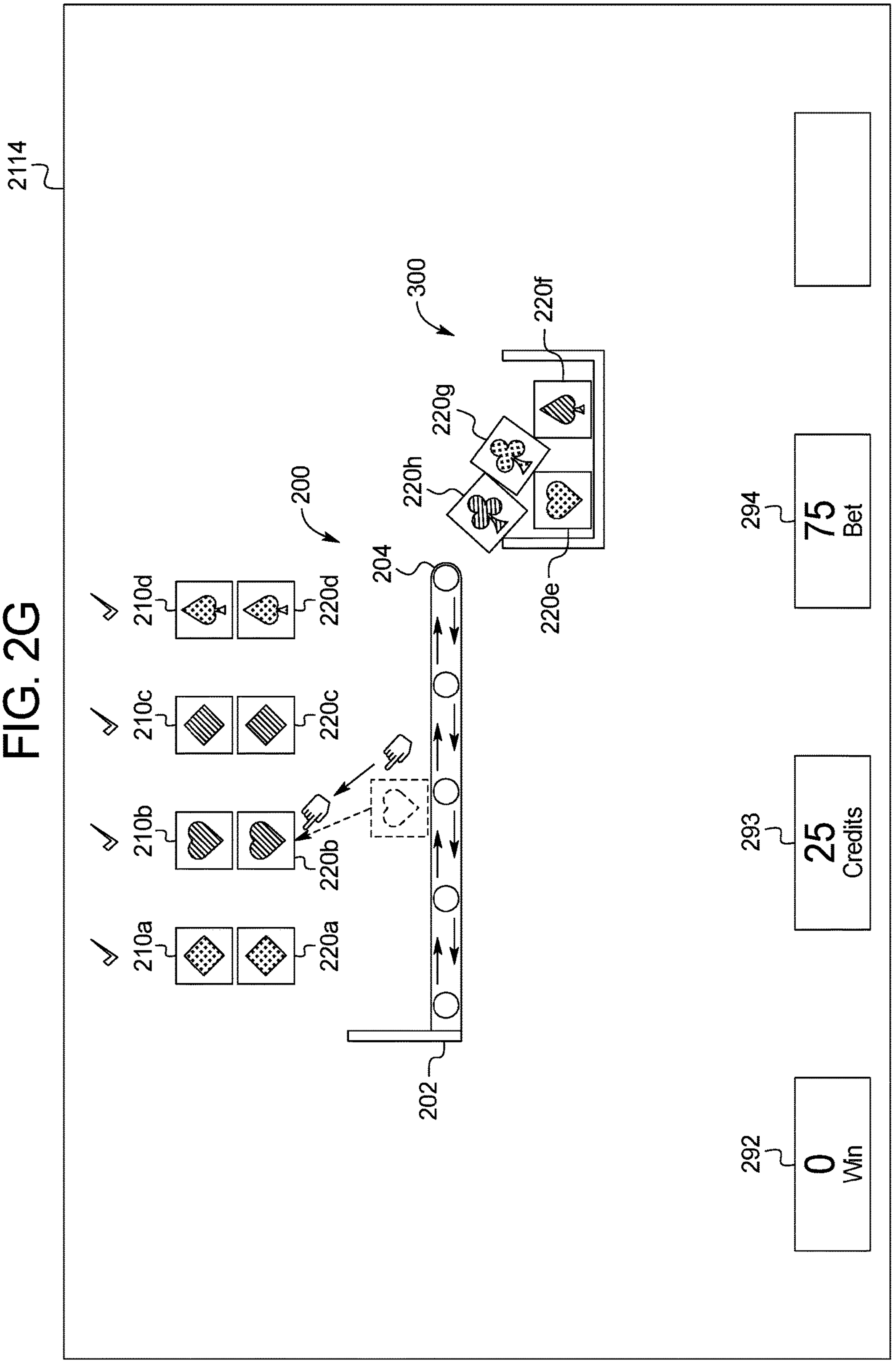

As illustrated in FIG. 2G, moving objects 220*a* and 220*c* have been matched with the target objects 210*a* and 210*c*, respectively, and moving objects 220*f*, 220*g*, and 220*h* have entered the object discard area 300. The gaming system receives a match input for the moving object 220*b*. The match input identifies the target object 210*b*. Since the target object 210*b* hasn't been matched with a moving object, the gaming system matches the moving object 220*b* with the target object 210*b* and displays the moving object 220*b* in association with the target object 210*b*.

Figure 2H:
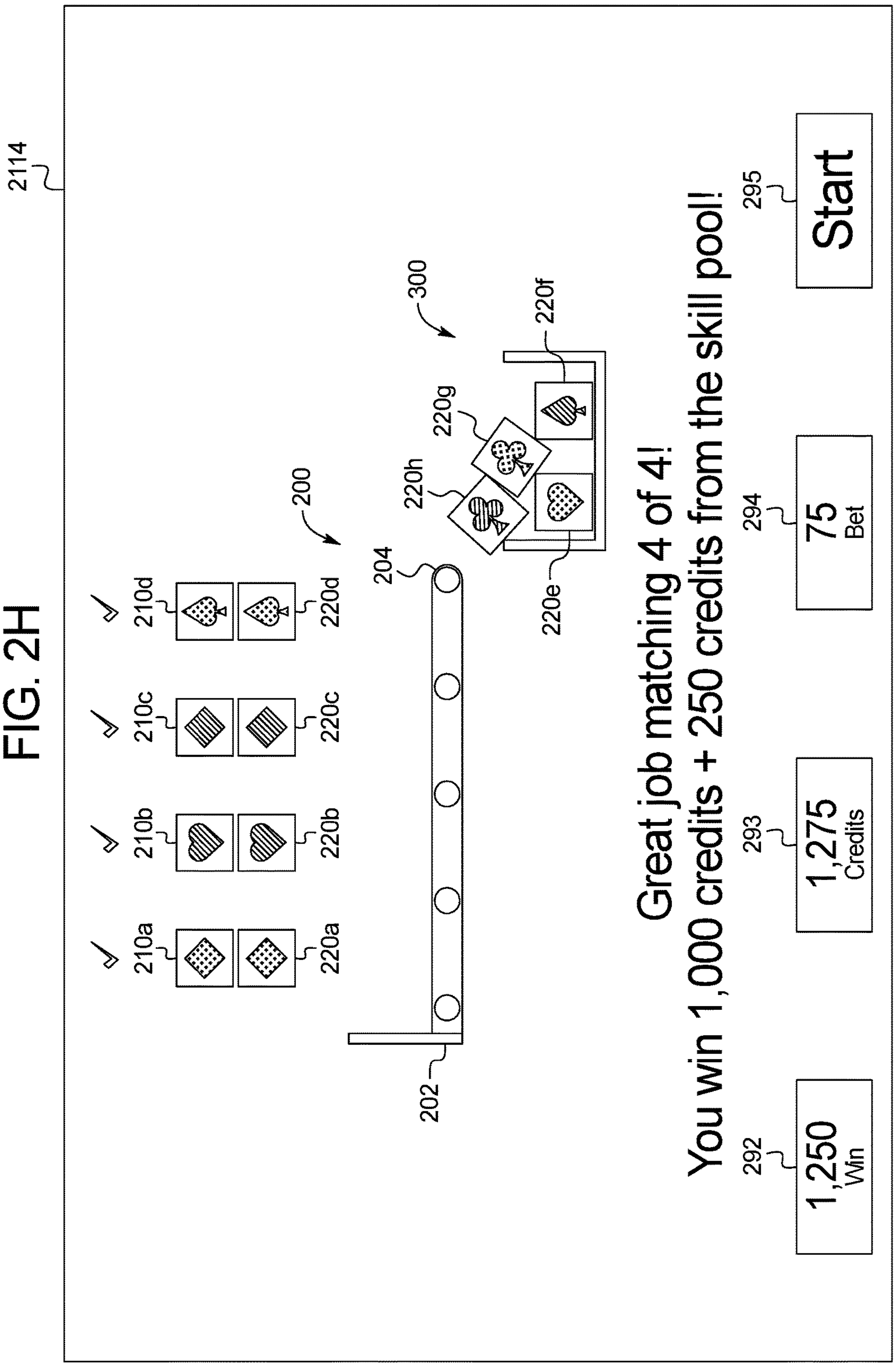

As illustrated in FIG. 2H, since all moving objects have either been matched with a target object or entered the object discard area, the play of the primary game is complete. The gaming system determines a quantity of correct matches by, for each target object, comparing the symbol of that target object with the symbol of any moving object matched with that target object. In this example embodiment, if the symbols are identical, the match is a correct match. Since the symbols of objects 210*a* and 220*a* are identical, the symbols of objects 210*b* and 220*b* are identical, the symbols of objects 210*c* and 220*c* are identical, and the symbols of objects 210*d* and 220*d* are identical, the gaming system determines a quantity of 4 correct matches (the maximum in this example embodiment).

In this example embodiment, the gaming system uses the quantity of correct matches to determine three things per Table 6 below: (1) the percentage of the maximum available primary award amount to use in determining the primary award; (2) if the play of the primary game is bonus eligible, whether the bonus triggering condition is met; and (3) whether the supplemental skill award condition is met (qualifying the player to win a supplemental skill award). This table and its values may vary depending on the desired AEP % of the wagering game and the experience the operator would like to provide players.

TABLE 6

Example use of quantity of correct matches

| Quantity of correct matches | Percentage of maximum available primary award amount | If bonus eligible, bonus triggering condition met? | Supplemental skill award condition met? |
|---|---|---|---|
| 4 | 100% | Yes | Yes |
| 3 | 50% | No | Yes |
| 0, 1, 2 | 0% | No | No |

Since the gaming system determined 4 correct matches, the gaming system determines a 1,000 credit primary award (100% of the 500 credit maximum available primary award amount multiplied by the 2× primary award multiplier). Since the play of the primary game is not bonus eligible, the gaming system doesn't provide a bonus (even though the bonus triggering condition is met). Since the gaming system determined 4 correct matches, the gaming system determines that the supplemental skill award condition is met. Accordingly, the gaming system determines a supplemental skill award by randomly determining, via a weighted Table 7 below, to provide 10% of the skill pool as a supplemental skill award. In this example embodiment, the skill pool includes 2,500 credits, so gaming system determines a supplemental skill award of 250 credits.

TABLE 7

Supplemental skill award weighted table

| Percentage of the skill pool | Probability of selection |
|---|---|
| 0% | 0.81% |
| 1% | 5.01% |
| 2% | 5.65% |
| 3% | 6.46% |
| 4% | 6.79% |
| 5% | 6.95% |
| 6% | 6.79% |
| 7% | 6.62% |
| 8% | 6.46% |
| 9% | 5.65% |
| 10% | 4.85% |
| 11% | 4.04% |
| 12% | 3.23% |
| 13% | 3.07% |
| 14% | 2.91% |
| 15% | 2.75% |
| 16% | 2.58% |
| 17% | 2.42% |
| 18% | 2.26% |
| 19% | 2.10% |
| 20% | 1.94% |
| 25% | 1.78% |
| 30% | 1.62% |
| 35% | 1.45% |
| 40% | 1.29% |
| 50% | 1.13% |
| 60% | 0.97% |
| 70% | 0.81% |
| 80% | 0.65% |
| 90% | 0.48% |
| 95% | 0.32% |
| 100% | 0.16% |

The gaming system displays the total 1,250 credit award in the award meter 292 and increases the credit balance from 25 credits to 1,275 credits to reflect the total award.

3. Variations

The above-described weighted tables are created such that the wagering game has a desired AEP % (that assumes perfect play). The weighted tables shown above are merely examples, and many variations are contemplated. For instance: (1) any suitable quantity of symbol similarity levels that represent any suitable levels of symbol similarity may be employed; (2) any suitable probabilities of being selected may be associated with the symbol similarity levels; (3) each maximum available primary award amount weighted table may include any suitable quantity of maximum available primary award amounts associated with any suitable probabilities; (4) any suitable quantity of object movement speeds that represent any suitable speeds may be employed; (5) any suitable probabilities of being selected may be associated with the object movement speeds; (6) each maximum available primary award modifier weighted table may include any suitable quantity of maximum available primary award modifiers associated with any suitable probabilities; and/or (7) the percentages of the skill pool and the associated probabilities of being selected of the supplemental skill award weighted table may be any suitable values.

The gaming system may select any suitable quantity of target objects and any suitable quantity of moving objects. The ratio of moving objects to target objects (above, 8:4) may be any suitable ratio. In certain embodiments, there are the same number of target and moving objects. In other embodiments, there are fewer moving objects than target objects.

In the embodiment described above with respect to FIGS. 2A-2H, a match is a correct match when the symbols of the matched target and moving objects are identical. In other embodiments, the gaming system may determine a correct match when any suitable match criteria is met, such as (but not limited to): the symbols of the matched target and moving objects sharing one or more characteristics (e.g., color, shape, size, theme); the symbols of the matched target and moving objects forming a resultant symbol (e.g., the symbols of the matched target and moving objects are two halves of a heart symbol); and/or the matched target and moving objects having matching or complementary sound tones (e.g., dogs barking or cats meowing).

The triggerable bonus may be any suitable bonus, such as a play of a game having an outcome based at least in part on a random determination, a play of a skill-based game, or an award. In certain embodiments, the wagering game does not have a triggerable bonus or bonus game.

The object exit condition may be satisfied for a moving object in any suitable manner, such as (but not limited to): the moving object being displayed for a designated period of time, the moving object reaching a particular area or position on the screen, the moving object interacting with a displayed exit object, or a timer expiring.

The gaming system may fund the skill pool via the primary (skill-based) game. For instance, when the gaming system determines (based on the player's skill level during the play of the primary game) to provide less than all of the determined maximum available primary award, the gaming system funds the skill pool with the difference (or a portion of the difference). For instance, assume the maximum available primary award for a play is 400 credits. For this play, the player achieved 3 of 4 correct matches. The gaming system therefore determines to provide a primary award of 200 credits (based on the maximum available primary award amount and the primary game multiplier). The gaming system funds the skill pool with the remaining 200 credits (i.e., the difference between the maximum available primary award and the actual primary award). This means that the wagers of players who perform sub-optimally during play of the primary skill-based game fund the skill pool, which players who perform well can then win via a skill award.

In various embodiments, different player skill levels (as determined based on skill inputs made during primary game play) are associated with different supplemental skill award weighted tables. In some embodiments, the higher the player skill level, the more lucrative the weighted table, and vice-versa.

In certain embodiments, a player cannot receive certain percentages of the skill pool as a supplemental skill award unless the player achieves a particular quantity of correct matches. For instance, the gaming system only enables players who achieve all available correct matches to win 100% of the skill pool. In other embodiments, the gaming system guarantees a supplemental skill award for players who achieve a particular quantity of matches. For instance, the gaming system guarantees a player a nonzero percentage of the skill pool as a supplemental skill award if the player achieves all available correct matches.

In certain embodiments, if a player incorrectly matches a moving object with a target object, the gaming system may randomly "undo" that incorrect match and reintroduce the moving object into the pool of objects to-be-displayed during game play. In one embodiment, the gaming system enables the player to earn anti-terminators, such as via primary or bonus game play or via purchase, that enable the player to selectively "undo" an incorrect match.

In certain embodiments, the gaming system may randomly determine to automatically correctly match one or more moving objects with one or more target objects. In one embodiment, the gaming system may randomly correct an incorrect match by replacing the incorrectly matched moving object (or target object) with a correctly matched moving object (or target object).

In certain embodiments, a moving object may be associated with a bonus symbol (or sub-symbol) that triggers a play of a bonus game, either by virtue of its display or upon a correct match with a corresponding target object. In various embodiments, a moving object may be associated with a progressive symbol (or sub-symbol) that triggers a win of a progressive award, either by virtue of its display or upon a correct match with a corresponding target object.

The gaming system may use the determined symbol similarity level to select the plurality of target objects and the plurality of moving objects from the plurality of different objects in any suitable manner and in accordance with any suitable object selection criteria such that the selected objects reflect the determined symbol similarity level. Table 8 below indicates the symbols of the set of 80 different objects (each of 10 symbol types having each of 8 symbol variations) from which the target and moving objects are selected for a play of an example embodiment of the skill-based wagering game. In this example embodiment, for the Easy symbol similarity level, the gaming system selects four target objects such that the four target object symbols do not share a symbol type or a symbol variation (e.g., Major 1, variation 1; Major 4, variation 4; Minor 3, variation 2; and Minor 5, variation 6). For the Medium symbol similarity level, the gaming system selects four target objects such that the four target object symbols do not share a symbol type, but may share a symbol variation (e.g., Major 1, variation 1; Major 2, variation 2; Minor 4, variation 4; Minor 5, variation 4). For the Hard symbol similarity level, the gaming system selects four target objects such that the four target object symbols may share a symbol type or a symbol variation (e.g., Major 1, variation 1; Major 1, variation 3; Major 3, variation 5; Major 3, variation 6). The gaming system may select the moving objects in accordance with the determined symbol similarity level. For instance, as the determined symbol similarity level gets more difficult, the moving objects that aren't target objects become more similar to the target objects.

TABLE 8

Example symbol types and variations

| | Object symbol variation | | | | | | | |
|---|---|---|---|---|---|---|---|---|
| Object symbol Type | 1 | 2 | 3 | 4 | 5 | 6 | 7 | 8 |
| Major 1 | | | | | | | | |
| Major 2 | | | | | | | | |
| Major 3 | | | | | | | | |
| Major 4 | | | | | | | | |
| Major 5 | | | | | | | | |
| Minor 1 | | | | | | | | |
| Minor 2 | | | | | | | | |
| Minor 3 | | | | | | | | |
| Minor 4 | | | | | | | | |
| Minor 5 | | | | | | | | |

The present disclosure contemplates that:

(a) the quantity of symbol similarity levels;

(b) the probabilities of being selected associated with the symbol similarity levels;

(c) the maximum available primary award amounts in the maximum available primary award amount weighted tables;

(d) the probabilities of being selected associated with the maximum available primary award amounts in the maximum available primary award amount weighted tables;

(e) the maximum available primary award modifiers in the maximum available primary award modifier weighted tables;

(f) the probabilities of being selected associated with the maximum available primary award modifiers in the maximum available primary award modifier weighted tables;

(g) the quantity of object movement speeds;

(h) the probabilities of being selected associated with the object movement speeds;

(i) the percentages of the skill pool and the associated probabilities of being selected of the supplemental skill award weighted table; and/or (j) any other variables or determinations described herein may be: (1) predetermined; (2) randomly determined; (3) randomly determined based on one or more weighted percentages (such as according to a weighted table); (4) determined based on a generated symbol or symbol combination; (5) determined independent of a generated symbol or symbol combination; (6) determined based on a random determination by a central controller (described below); (7) determined independent of a random determination by the central controller; (8) determined based on a random determination at an EGM; (9) determined independent of a random determination at the EGM; (10) determined based on at least one play of at least one game; (11) determined independent of at least one play of at least one game; (12) determined based on a player's selection; (13) determined independent of a player's selection; (14) determined based on one or more side wagers placed; (15) determined independent of one or more side wagers placed; (16) determined based on the player's wager or wager level; (17) determined independent of the player's wager or wager level; (18) determined based on time (such as the time of day); (19) determined independent of time (such as the time of day); (20) determined based on an amount of coin-in accumulated in one or more pools; (21) determined independent of an amount of coin-in accumulated in one or more pools; (22) determined based on a status of the player (i.e., a player tracking status); (23) determined independent of a status of the player (i.e., a player tracking status); (24) determined based on one or more other determinations disclosed herein; (25) determined independent of any other determination disclosed herein; or (26) determined in any other suitable manner or based on or independent of any other suitable factor(s).

4. Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, the term "EGM" is used herein to refer to an electronic gaming machine (such as a slot machine, a video poker machine, a video lottery terminal (VLT), a video keno machine, or a video bingo machine located on a casino floor). Additionally, for brevity and clarity and unless specifically stated otherwise, "EGM" as used herein represents one EGM or a plurality of EGMs, "personal computing device" as used herein represents one personal computing device or a plurality of personal computing devices, and "central server, central controller, or remote host" as used herein represents one central server, central controller, or remote host or a plurality of central servers, central controllers, or remote hosts.

Figure 3:
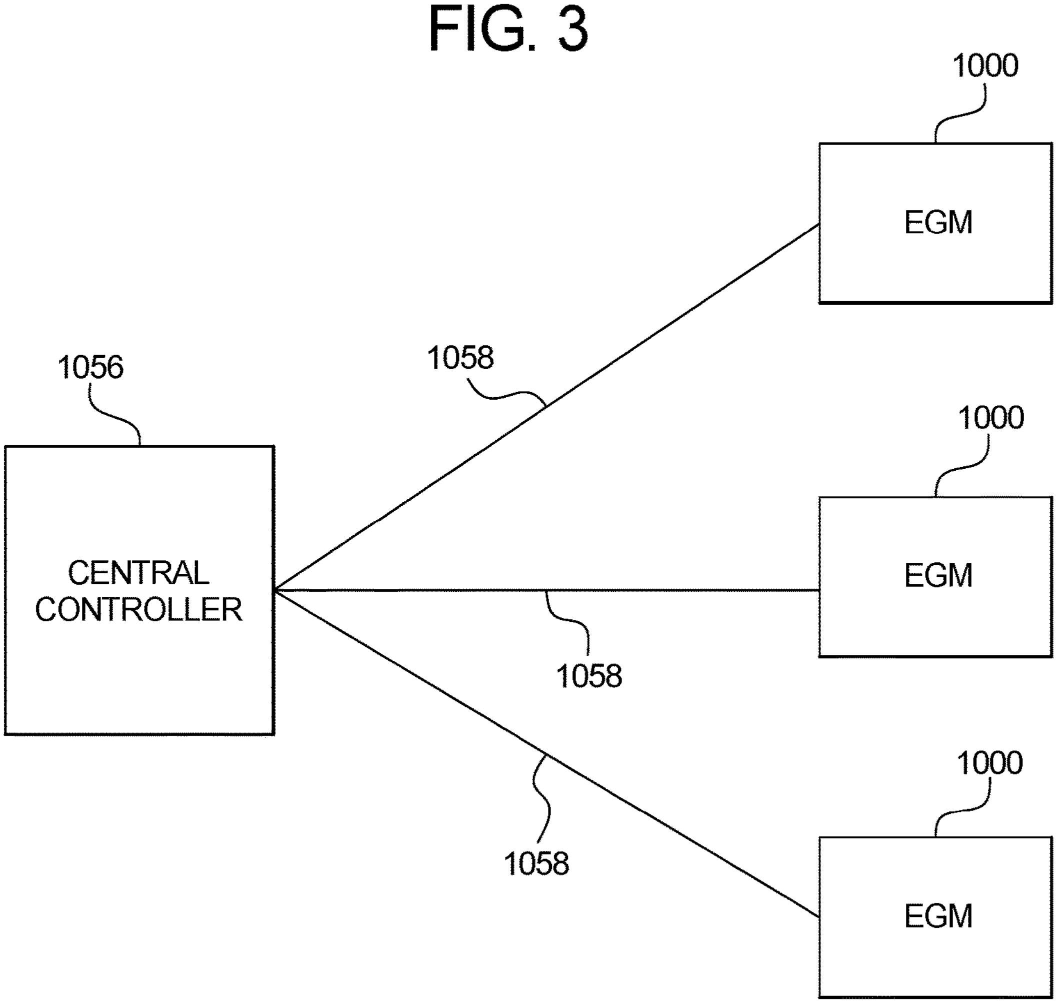
FIG. 3 is a schematic block diagram of one embodiment of a network configuration of the gaming system of the present disclosure.

As noted above, in various embodiments, the gaming system includes an EGM (or personal computing device) in combination with a central server, central controller, or remote host. In such embodiments, the EGM (or personal computing device) is configured to communicate with the central server, central controller, or remote host through a data network or remote communication link. In certain such embodiments, the EGM (or personal computing device) is configured to communicate with another EGM (or personal computing device) through the same data network or remote communication link or through a different data network or remote communication link. For example, the gaming system illustrated in FIG. 3 includes a plurality of EGMs 1000 that are each configured to communicate with a central server, central controller, or remote host 1056 through a data network 1058.

In certain embodiments in which the gaming system includes an EGM (or personal computing device) in combination with a central server, central controller, or remote host, the central server, central controller, or remote host is any suitable computing device (such as a server) that includes at least one processor and at least one memory device or data storage device. As further described herein, the EGM (or personal computing device) includes at least one EGM (or personal computing device) processor configured to transmit and receive data or signals representing events, messages, commands, or any other suitable information between the EGM (or personal computing device) and the central server, central controller, or remote host. The at least one processor of that EGM (or personal computing device) is configured to execute the events, messages, or commands represented by such data or signals in conjunction with the operation of the EGM (or personal computing device). Moreover, the at least one processor of the central server, central controller, or remote host is configured to transmit and receive data or signals representing events, messages, commands, or any other suitable information between the central server, central controller, or remote host and the EGM (or personal computing device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal computing device). Further, one, more than one, or each of the functions of the at least one processor of the EGM (or personal computing device) may be performed by the at least one processor of the central server, central controller, or remote host.

In certain such embodiments, computerized instructions for controlling any games (such as any primary or base games and/or any secondary or bonus games) displayed by the EGM (or personal computing device) are executed by the central server, central controller, or remote host. In such "thin client" embodiments, the central server, central controller, or remote host remotely controls any games (or other suitable interfaces) displayed by the EGM (or personal computing device), and the EGM (or personal computing device) is utilized to display such games (or suitable interfaces) and to receive one or more inputs or commands. In other such embodiments, computerized instructions for controlling any games displayed by the EGM (or personal computing device) are communicated from the central server, central controller, or remote host to the EGM (or personal computing device) and are stored in at least one memory device of the EGM (or personal computing device). In such "thick client" embodiments, the at least one processor of the EGM (or personal computing device) executes the computerized instructions to control any games (or other suitable interfaces) displayed by the EGM (or personal computing device).

In various embodiments in which the gaming system includes a plurality of EGMs (or personal computing devices), one or more of the EGMs (or personal computing devices) are thin client EGMs (or personal computing devices) and one or more of the EGMs (or personal computing devices) are thick client EGMs (or personal computing devices). In other embodiments in which the gaming system includes one or more EGMs (or personal computing devices), certain functions of one or more of the EGMs (or personal computing devices) are implemented in a thin client environment, and certain other functions of one or more of the EGMs (or personal computing devices) are implemented in a thick client environment. In one such embodiment in which the gaming system includes an EGM (or personal computing device) and a central server, central controller, or remote host, computerized instructions for controlling any primary or base games displayed by the EGM (or personal computing device) are communicated from the central server, central controller, or remote host to the EGM (or personal computing device) in a thick client configuration, and computerized instructions for controlling any secondary or bonus games or other functions displayed by the EGM (or personal computing device) are executed by the central server, central controller, or remote host in a thin client configuration.

In certain embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is a local area network (LAN) in which the EGMs (or personal computing devices) are located substantially proximate to one another and/or the central server, central controller, or remote host. In one example, the EGMs (or personal computing devices) and the central server, central controller, or remote host are located in a gaming establishment or a portion of a gaming establishment.

In other embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is a wide area network (WAN) in which one or more of the EGMs (or personal computing devices) are not necessarily located substantially proximate to another one of the EGMs (or personal computing devices) and/or the central server, central controller, or remote host. For example, one or more of the EGMs (or personal computing devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal computing devices) are located. In certain embodiments in which the data network is a WAN, the gaming system includes a central server, central controller, or remote host and an EGM (or personal computing device) each located in a different gaming establishment in a same geographic area, such as a same city or a same state. Gaming systems in which the data network is a WAN are substantially identical to gaming systems in which the data network is a LAN, though the quantity of EGMs (or personal computing devices) in such gaming systems may vary relative to one another.

In further embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is an internet (such as the Internet) or an intranet. In certain such embodiments, an Internet browser of the EGM (or personal computing device) is usable to access an Internet game page from any location where an Internet connection is available. In one such embodiment, after the EGM (or personal computing device) accesses the Internet game page, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal computing device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal computing device). Examples of implementations of Internet-based gaming are further described in U.S. Pat. No. 8,764,566, entitled "Internet Remote Game Server," and U.S. Pat. No. 8,147,334, entitled "Universal Game Server," which are incorporated herein by reference.

The central server, central controller, or remote host and the EGM (or personal computing device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal computing devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

5. EGM Components

Figure 4:
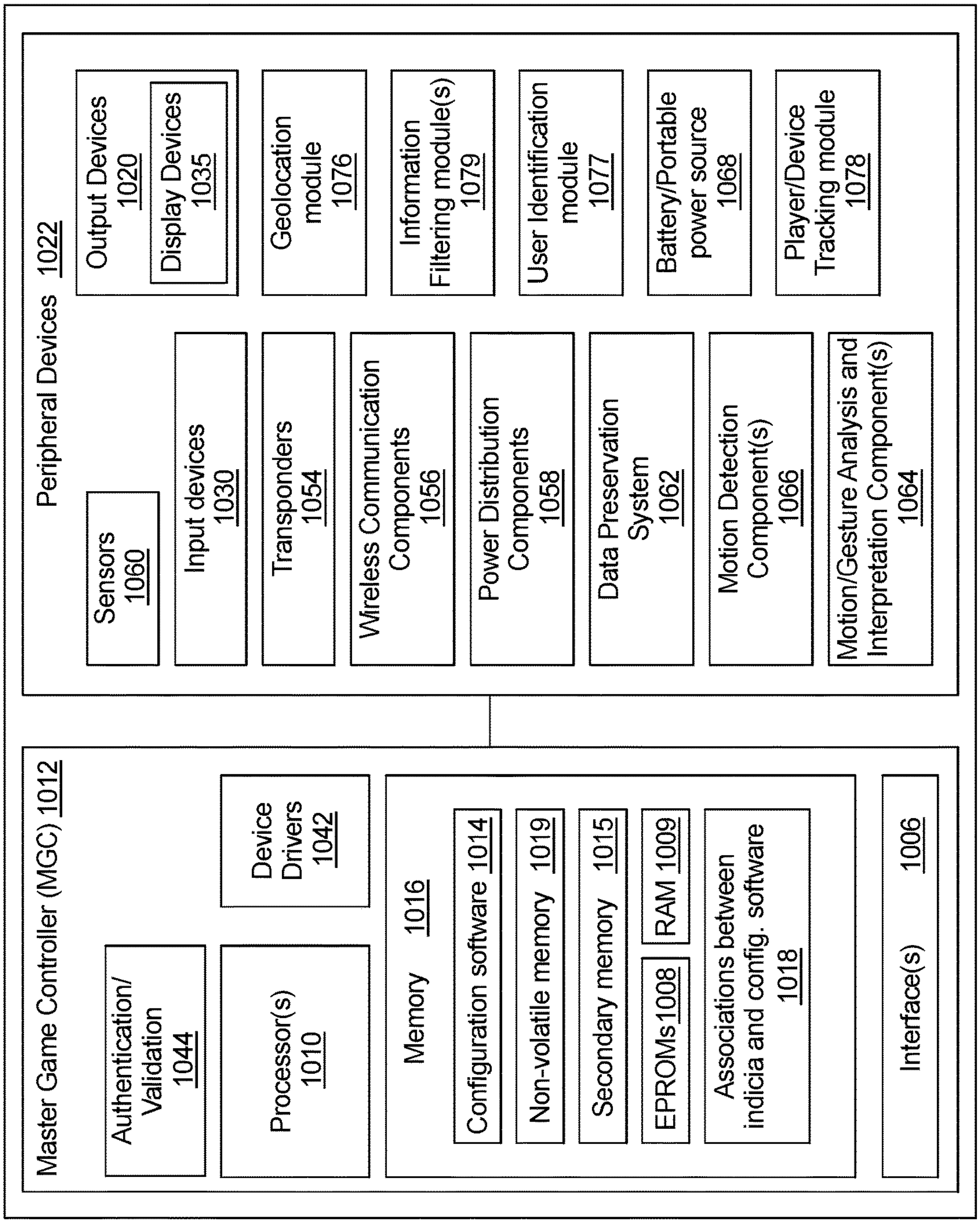
FIG. 4 is a schematic block diagram of an example electronic configuration of the gaming system of the present disclosure.
Figure 5A:
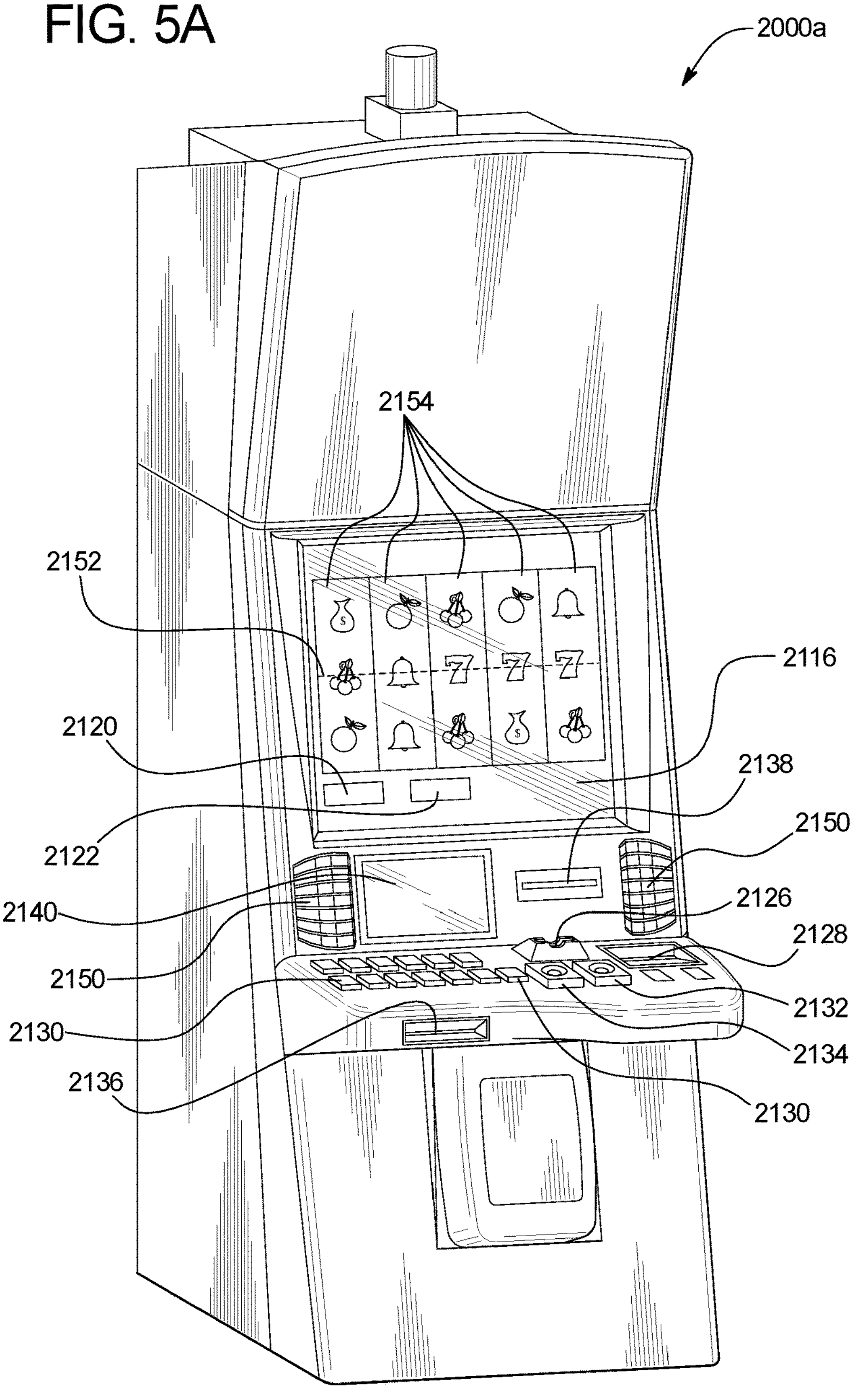
FIGS. 5A and 5B are perspective views of example alternative embodiments of the gaming system of the present disclosure.
Figure 5B:
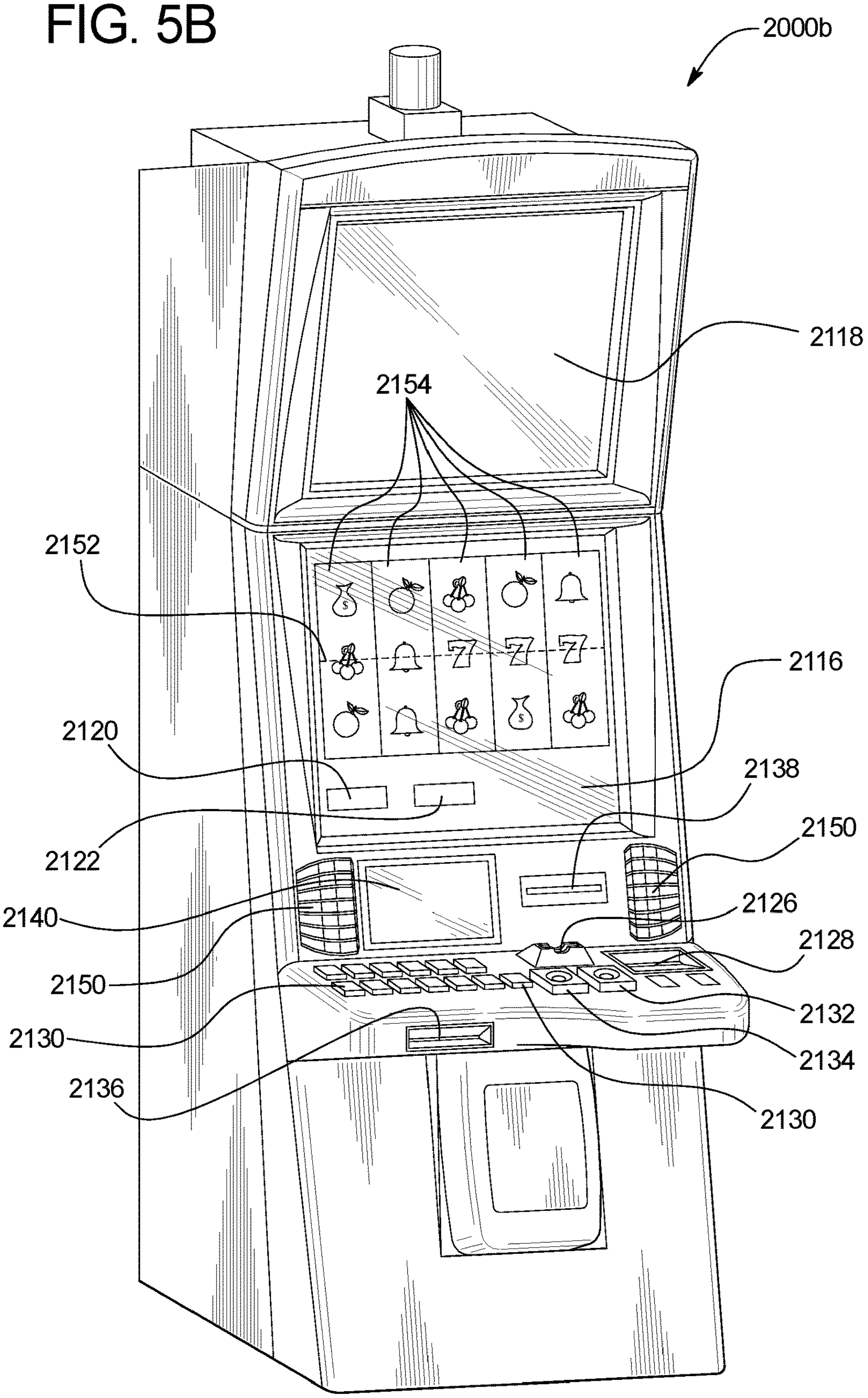

FIG. 4 is a block diagram of an example EGM 1000 and FIGS. 5A and 5B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets," which is incorporated herein by reference.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 5A includes a central display device 2116, a player tracking display 2140, a credit display 2120, and a bet display 2122. The example EGM 2000*b* illustrated in FIG. 5B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 5A and 5B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; U.S. Pat. No. 6,048,269, entitled "Coinless Slot Machine System and Method"; and U.S. Pat. No. 5,290,003, entitled "Gaming Machine and Coupons," which are incorporated herein by reference.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine," which is incorporated herein by reference.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 5A and 5B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 5A and 5B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine," which is incorporated herein by reference. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 5A and 5B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 5A and 5B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 5A and 5B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 5A and 5B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 5A and 5B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 5A and 5B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

6. Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game," which are incorporated herein by reference.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern," which are incorporated herein by reference.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services," which are incorporated herein by reference.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 5B includes a payline 1152 and a plurality of reels 1154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations," which are incorporated herein by reference.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards," which are incorporated herein by reference As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win," which are incorporated herein by reference.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services," which are incorporated herein by reference.

7. Differentiating Certain Gaming Systems from General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes," which are incorporated herein by reference.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just prior to the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just prior to when the malfunction occurred. The restored state may include metering information and graphical information that was displayed on the EGM in the state prior to the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just prior to the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM prior to, during, and/or after the disputed game to demonstrate whether the player was correct or not in her assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play," which are incorporated herein by reference.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification," which is incorporated herein by reference.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment," which is incorporated herein by reference.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System," which is incorporated herein by reference.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one display device;

at least one input device;

at least one processor; and at least one memory device that stores a plurality of instructions that, when executed by the at least one processor, cause the at least one processor to:

randomly determine one of a plurality of different difficulty levels for a play of a skill-based game;

randomly determine one of a plurality of different maximum available primary awards for the play of the skill-based game;

randomly determine a plurality of target objects and a plurality of moving objects from a set of a plurality of objects based on a first aspect of the determined difficulty level;

cause the at least one display device to display the target objects;

cause the at least one display device to display the moving objects moving relative to the target objects;

responsive to receiving, for one of the moving objects, a match input that identifies one of the target objects, match that moving object with that target object; and responsive to a game ending condition being satisfied:

determine a quantity of moving objects correctly matched with target objects;

determine a primary award based on the quantity of correct matches and the determined maximum available primary award; and cause the at least one display device to display the determined primary award.

2. The gaming system of claim 1, wherein a second aspect of the determined difficulty level is an object movement speed that controls a speed of movement of the moving objects.

3. The gaming system of claim 2, wherein the plurality of instructions, when executed by the at least one processor, cause the at least one processor to randomly determine the object movement speed from a plurality of different object movement speeds.

4. The gaming system of claim 1, wherein each object has one of a plurality of different symbols.

5. The gaming system of claim 4, wherein a match is a correct match when the symbols of a matched target and moving symbols correspond to one another.

6. The gaming system of claim 5, wherein identical symbols correspond to one another.

7. The gaming system of claim 5, wherein the first aspect of the determined difficulty level is a symbol similarity level that controls how similar the symbols on the moving objects are to one another.

8. The gaming system of claim 7, wherein the plurality of instructions, when executed by the at least one processor, cause the at least one processor to randomly determine the symbol similarity level from a plurality of different symbol similarity levels.

9. The gaming system of claim 1, wherein the plurality of instructions, when executed by the at least one processor, cause the at least one processor to determine if a supplemental skill award condition is met based on the quantity of correct matches and, if so, randomly determine a supplemental skill award and cause the at least one display device to display the randomly determined supplemental skill award.

10. A gaming system comprising:

at least one display device;

at least one input device;

at least one processor; and at least one memory device that stores a plurality of instructions that, when executed by the at least one processor, cause the at least one processor to:

randomly determine one of a plurality of different difficulty levels for a play of a skill-based game;

randomly determine one of a plurality of different maximum available primary awards for the play of the skill-based game;

randomly determine a plurality of target objects and a plurality of moving objects from a set of a plurality of objects based on a first aspect of the determined difficulty level;

cause the at least one display device to display the target objects;

for each moving object:

cause the at least one display device to display that moving object;

enable input of a match input for that moving object;

responsive to receiving, for that moving object, a match input that identifies one of the target objects, match that moving object with that target object; and responsive to an occurrence of an object exit condition, stop enabling input of the match input for that moving object; and responsive to a game ending condition being satisfied:

determine a quantity of moving objects correctly matched with target objects;

determine a primary award based on the quantity of correct matches and the determined maximum available primary award; and cause the at least one display device to display the determined primary award.

11. The gaming system of claim 10, wherein at least one moving object is stationary relative to the target objects when displayed after the object exit condition.

12. The gaming system of claim 10, wherein the object exit condition occurs for a moving object when a designated period of time associated with the moving object expires.

13. The gaming system of claim 10, wherein each object has one of a plurality of different symbols.

14. The gaming system of claim 13, wherein a match is a correct match when the symbols of matched target and moving symbols correspond to one another.

15. The gaming system of claim 14, wherein identical symbols correspond to one another.

16. The gaming system of claim 14, wherein the first aspect of the determined difficulty level is a symbol similarity level that controls how similar the symbols on the moving objects are to one another.

17. The gaming system of claim 16, wherein the plurality of instructions, when executed by the at least one processor, cause the at least one processor to randomly determine the symbol similarity level from a plurality of different symbol similarity levels.

18. The gaming system of claim 10, wherein the plurality of instructions, when executed by the at least one processor, cause the at least one processor to determine if a supplemental skill award condition is met based on the quantity of correct matches and, if so, randomly determine a supplemental skill award and cause the at least one display device to display the randomly determined supplemental skill award.

* * * * *